(12) United States Patent
Pathan et al.

(10) Patent No.: US 10,867,380 B1
(45) Date of Patent: Dec. 15, 2020

(54) OBJECT AND DATA POINT TRACKING TO CONTROL SYSTEM IN OPERATION

(71) Applicant: SAS INSTITUTE INC., Cary, NC (US)

(72) Inventors: Sharmin Pathan, Seattle, WA (US); Hamza Mustafa Ghadyali, Apex, NC (US); Xunlei Wu, Cary, NC (US); Ivan Borges Oliveira, Bellevue, WA (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/863,093

(22) Filed: Apr. 30, 2020

Related U.S. Application Data

(60) Provisional application No. 62/869,278, filed on Jul. 1, 2019.

(51) Int. Cl.
*G06T 7/00* (2017.01)
*G05B 19/418* (2006.01)
(Continued)

(52) U.S. Cl.
CPC ........ *G06T 7/0004* (2013.01); *G05B 19/4183* (2013.01); *G06F 16/9035* (2019.01); *G06N 3/08* (2013.01); *G06T 2210/12* (2013.01)

(58) Field of Classification Search
CPC .............. G06T 7/0004; G06T 2210/12; G06F 16/9035; G05B 19/4183; G06N 3/08
See application file for complete search history.

(56) References Cited

U.S. PATENT DOCUMENTS 9,477,220 B2    10/2016   Shteinfeld et al.
10,372,734 B2 *  8/2019   Trovero ............... G06F 16/285
(Continued)

FOREIGN PATENT DOCUMENTS

CN    108875600 A    11/2018
CN    109118523 A    1/2019
CN    109902677 A    6/2019

OTHER PUBLICATIONS

Huang, X. et al., "Intelligent Intersection: Two-Stream Convolutional Networks for Real-time Near Accident Detection in Traffic Video", Cornell University Computer Science, Jan. 4, 2019, pp. 1-23.
(Continued)

*Primary Examiner* — Santiago Garcia
(74) *Attorney, Agent, or Firm* — Coats & Bennett PLLC

(57) ABSTRACT

A computing system obtains image data capturing first and second objects. The system determines, based on user-identified data points, boundaries of the objects and generates a component of a dataset by computing a first data value related to an attribute of a key point in the first image; and computing a second data value related to an attribute of a key point in the first image. The system generates a second component of the dataset, the second component representing updated relative information between the first and second object by generating predicted changes in the first data value and second data value for the second image. The system computes a third data value and a fourth data value related to respective data points in a first and second polygon in the second image. The generating the updated relative information is based on the predicted changes and computed values.

30 Claims, 26 Drawing Sheets

(51) Int. Cl.
*G06F 16/9035* (2019.01)
*G06N 3/08* (2006.01)

(56) References Cited

U.S. PATENT DOCUMENTS

| | | | | |
|---|---|---|---|---|
| 2018/0173173 | A1* | 6/2018 | Leonard | G06F 17/16 |
| 2018/0222043 | A1* | 8/2018 | Trovero | H04L 69/40 |
| 2019/0251702 | A1* | 8/2019 | Chandler | G06F 3/013 |
| 2020/0175075 | A1* | 6/2020 | Makhija | G06F 16/9035 |

OTHER PUBLICATIONS

Gupta, S., "How Visual Object Detection can Transform Manufacturing Industries", pp. 1-5, retrieved on May 28, 2018, retrieved from internet https://hackernoon.com/how-visual-objection-detection-can-transform-manufacturing-industries-8b6698cc0a47.

Benhimane, S. et al., "Real-Time Object Detection and Tracking for Industrial Applications", Computer Science, 2008, pp. 1-8

Durant, T., "Tracking Things in Object Detection Videos", pp. 1-9, retrieved on Apr. 26, 2018, retrieved from internet https://lab.moovel.com/blog/tracking-things-in-object-detection-videos.

4th Vector Technologies, "Integrating Machines: Machine Vision Integrator", pp. 1-9, retrieved on Jul. 25, 2019, retrieved from internet https://www.4thvectortech.com.

Wojke, N. et al., "Simple Online and Realtime Tracking with a Deep Association Metric", Cornell University Computer Science, Mar. 21, 2017, pp. 1-5.

Wang, Y. et al., "PointIT: A Fast Tracking Framework Based on 3D Instance Segmentation", Cornell University Computer Science, Feb. 18, 2019, pp. 1-6.

Hardin, W., "Better, Faster, Cheaper: Machine Vision Comes of Age in Automotive Manufacturing", Collaborative Robots, Advanced Vision and Al Conference, Nov. 12-13, 2019, pp, 1-5, Vision Online.

Vengateshwaran, N., "Building a YOLO objection detection model using SAS", The SAS Data Science Blog, Mar. 21, 2019, pp. 1-11, retrieved from Internet https://blogs.sas.com/content/subconsciousmusings/2019/03/21/building a-yolo-object-detection-model-using-sas/.

Boudewijn, C. et al., "Computer Vision at the luggage handling system of Brussels airport", May 16, 2012, pp. 1-86.

Gong, J. et al., "Computer Vision-Based Video interpretation Model for Automated Productivity Analysis of Construction Operations", Journal of Computing in Civil Engineering, May/Jun. 2010, pp. 252-263.

Integro Technologies, "High Speed Machine Vision Inspection", pp. 1-11, retrieved on Jul. 25, 2019, retrieved from internet https://integro-tech.com/high-speed-inspection/.

Cognex, "Introduction to Machine Vision: A guide to automating process & quality improvements", 2016, pp. 1-24.

Ananthakrishnan, "Multi Object Tracker Using Kalman Filter & Hungarian Algorithm", pp. 1-2, retrieved on Jul. 25, 2016, retrieved from internet https://github.com/srianant/kaiman_filter_multi_object_tracking.

Chauhan, V. et al., "A Comparative Study of Machine Vision Based Methods for Fault Detection in an Automated Assembly Machine", 43rd Proceedings of the North American Manufacturing Research Institution of SME, 2015, pp, 416-428.

CVI-IITM, "Summer School Session 4: Tracking Methods—Meanshift, Camshift and Kalman Filter", pp. 1-29, retrieved on Jul. 25, 2019, retrieved from internet https://iitmcvg.github.io/summer_school/Session4/.

Mathworks, "Using Kalman Filter for Object Tracking—MATLAB & Simulink", pp. 1-10, retrieved on Jul. 25, 2019, retrieved from internet https://www.mathworks.com/help/vision/examples/using-kalman-filter-for-object-tracking.html.

* cited by examiner

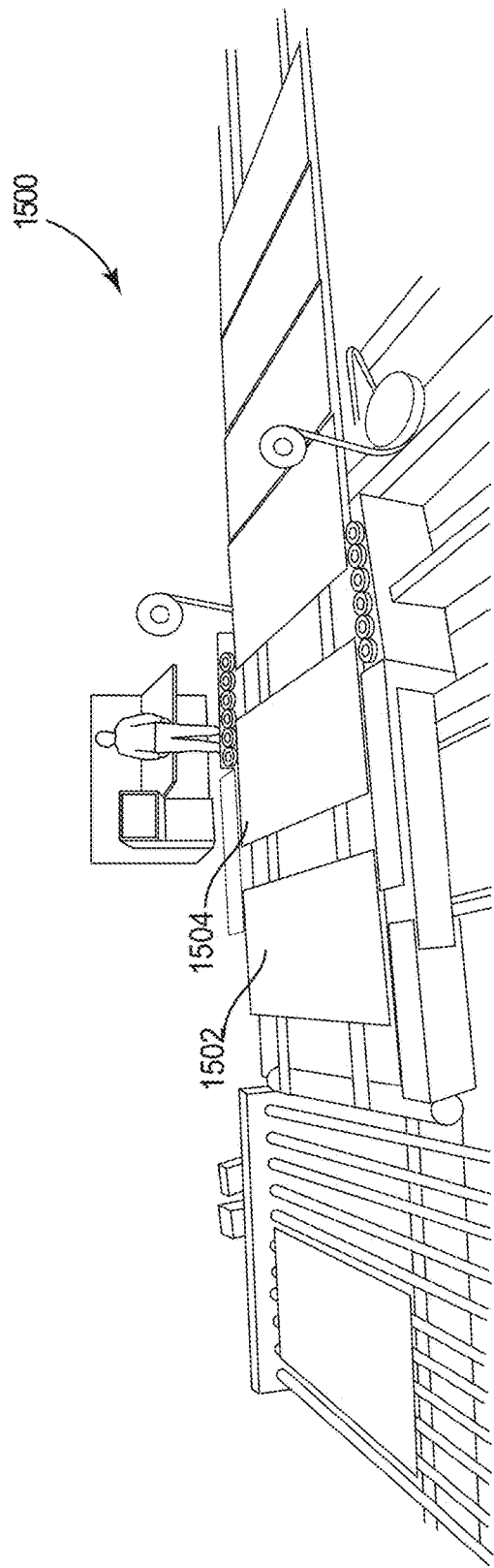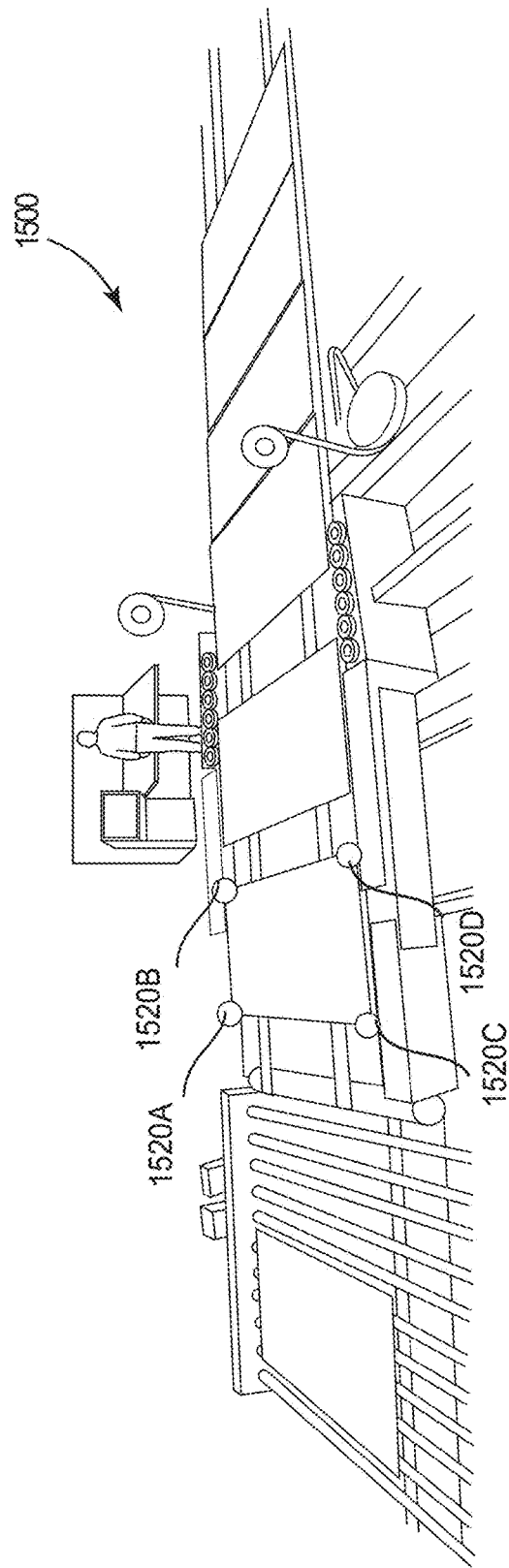

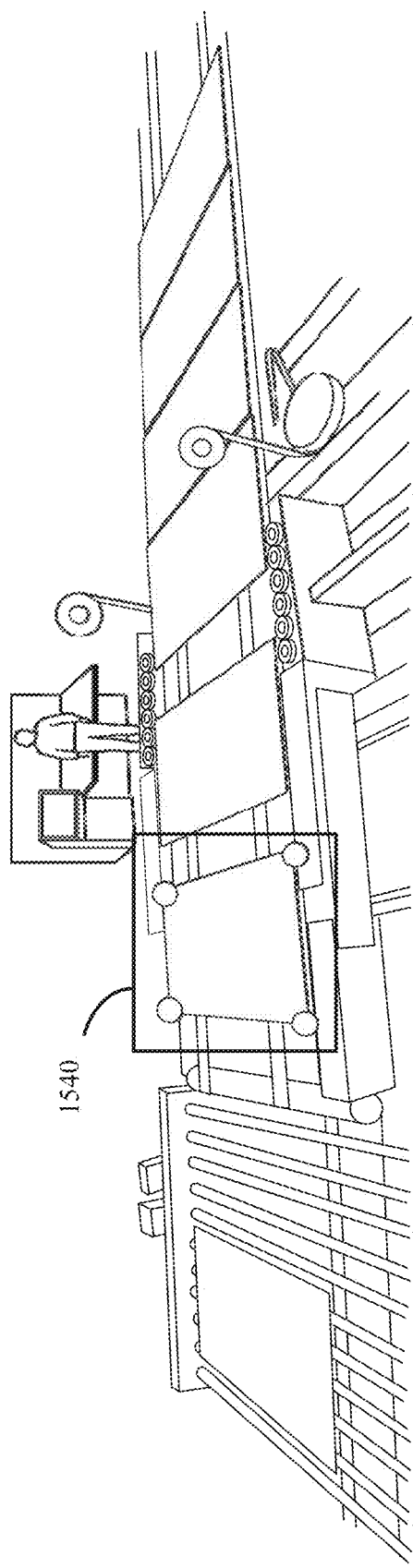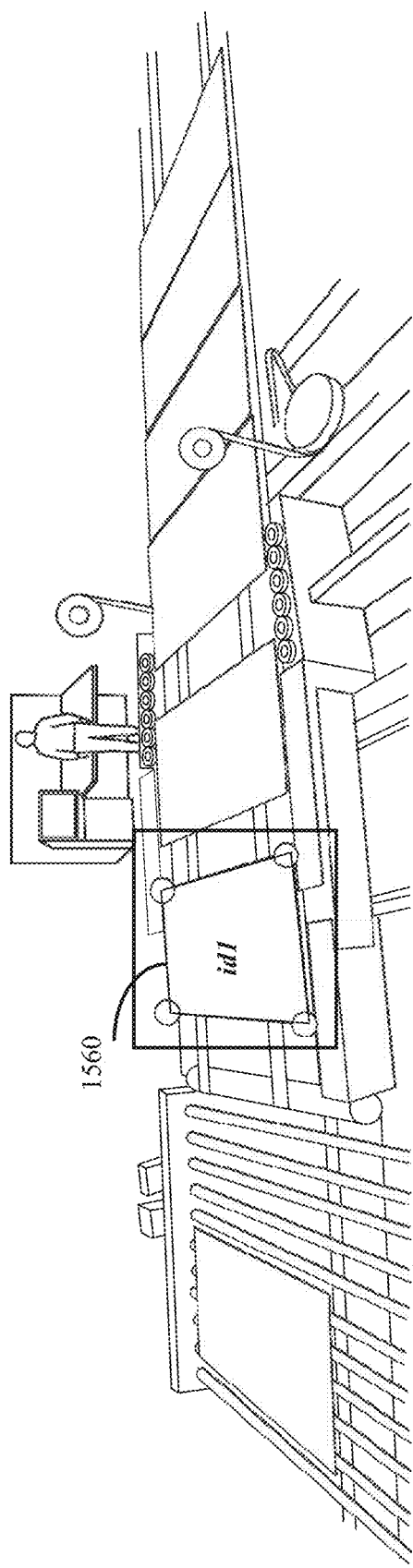

| Key Point | Object | Position | Velocity | Acceleration |
|---|---|---|---|---|
| Key Point 1 | id1 | (X,Y) | . | . |
| Key Point 2 | id1 | (X,Y) | . | . |
| Key Point 3 | id1 | (X,Y) | . | . |
| Key Point 4 | id1 | (x,y) | . | . |
| Derived Key Point 5 | id1 | (Cx,Cy) | . | . |

| Object | Size | Position | Velocity | Acceleration | # of Objects | Skew | Distance to Forward Object | Distance to Back Object |
|--------|------|----------|----------|--------------|--------------|------|----------------------------|-------------------------|
| id6 | 4x2 | Key Point 5 | .5m/s | -2m/s^2 | 7 | 0% | 107cm | 237 cm |

| Key Point | Object | Position | Change | Uncertainty | Time |
|---|---|---|---|---|---|
| Key Point 1 | id1 | (x,y) | x+1 | 98% | t |
| Key Point 1 | id1 | (x,y) | x+1, y+1 | 1% | t |
| Key Point 1 | id1 | (x,y) | x+1, y-1 | 1% | t |

1800

| Key Point | Object | Position | Change | Uncertainty | Time |
|---|---|---|---|---|---|
| Key Point 1 | id1 | (x+1,y+1) | x+1 | 10% | t+1 |
| Key Point 1 | id1 | (x+1,y+1) | x+1, y+1 | 85% | t+1 |
| Key Point 1 | id1 | (x+1,y+1) | x+1, y-1 | 5% | t+1 |

OBJECT AND DATA POINT TRACKING TO CONTROL SYSTEM IN OPERATION

RELATED APPLICATIONS

This application claims the benefit of U.S. Provisional Application No. 62/869,278, filed Jul. 1, 2019, the disclosure of which is incorporated herein by reference in its entirety.

BACKGROUND

Manufacturing environments often involve an automated process for producing similar products. This automated process may use, for instance, conveyer belts to move an assembly line of similar products in a synchronized fashion through development stages. The assembly line may be sensitive to changes in the timing or orientation of objects moving through these development stages. The automated process may have little to no direct operator oversight to observe these changes. This lack of oversight may lead to problems for the assembly line. For instance, products may run into each other or turn leading to damaged products or damaged equipment for the assembly line. If the damage is severe enough, the entire assembly line may need to be shut down to correct the issue.

SUMMARY

In an example embodiment, a computer-program product tangibly embodied in a non-transitory machine-readable storage medium is provided. The computer-program product includes instructions to cause a computing system to obtain data representing a first image of a plurality of images. Each of the plurality of images captures different time points of a system in operation. The system in operation comprises a first object and a second object different from the first object. The computer-program product includes instructions to cause a computing system to receive an indication of user-identified data points in a plurality of data points in the data representing the first image. The indication indicates an image coordinate location for each of the user-identified data points in a first coordinate system associated with the first image. The user-identified data points identify the first object and the second object in the first image. The computer-program product includes instructions to cause a computing system to determine, based on a first set of data points of the user-identified data points, a first boundary of the first object in the first image. The computer-program product includes instructions to cause a computing system to determine, based on a second set of data points of the user-identified data points, a second boundary of the second object in the first image. The computer-program product includes instructions to cause a computing system to identify a first polygon defined by the first boundary. The first polygon represents the first object in the system in operation. The computer-program product includes instructions to cause a computing system to identify a second polygon defined by the second boundary. The second polygon represents the second object in the system in operation. The computer-program product includes instructions to cause a computing system to generate a first component of a dataset, the first component representing initial relative information between the first object and the second object, by computing a first data value related to an attribute of a key point of the first set of data points in the first image; and computing a second data value related to an attribute of a key point of the second set of data points in the first image. The computing system generates, based on the first data value and the second data value, the initial relative information between the first object and the second object. The computer-program product includes instructions to cause a computing system to generate a second component of the dataset, the second component representing updated relative information between the first object and the second object, by obtaining data representing a second image of the plurality of images subsequent to the first image; and detecting the first polygon and the second polygon in the second image. The computing system determines one or more data points in the first polygon in the second image. The computing system determines one or more data points in the second polygon in the second image. The computing system generates a predicted change in the first data value for the second image. The computing system generates a predicted change in the second data value for the second image. The computing system computes a third data value related to a data point of the one or more data points in the first polygon in the second image. The data point corresponds to the key point of the first set of data points in the first image. The computing system computes a fourth data value related to a data point of the one or more data points in the second polygon in the second image. The data point corresponds to the key point of the second set of data points in the first image. The computing system generates the updated relative information between the first object and the second object. The generating the updated relative information is based on the predicted change in the first data value, the predicted change in the second data value, the third data value, and the fourth data value. The computer-program product includes instructions to cause a computing system to output one or more components of the dataset.

In another example embodiment, a computing device is provided. The computing device includes, but is not limited to, a processor and memory. The memory contains instructions that when executed by the processor control the computing device to output one or more components of the dataset described herein.

In another example embodiment, a method is provided of outputting one or more components of the dataset described herein.

Other features and aspects of example embodiments are presented below in the Detailed Description when read in connection with the drawings presented with this application.

BRIEF DESCRIPTION OF THE DRAWINGS

FIGS. 15A-D illustrate examples of object identification in an image in at least one embodiment of the present technology.

FIG. 18 illustrates an example of predicted changes for a data point in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
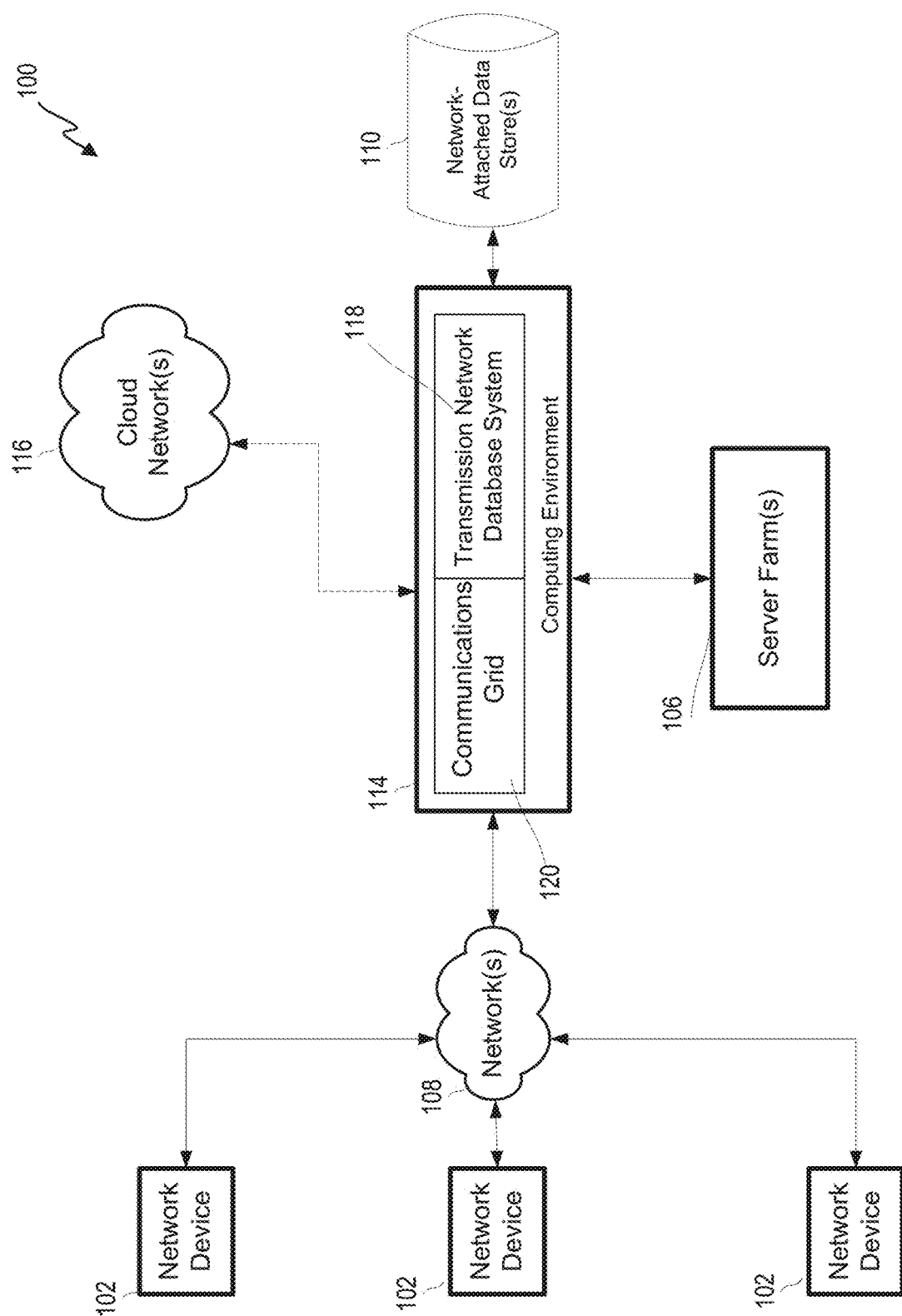
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
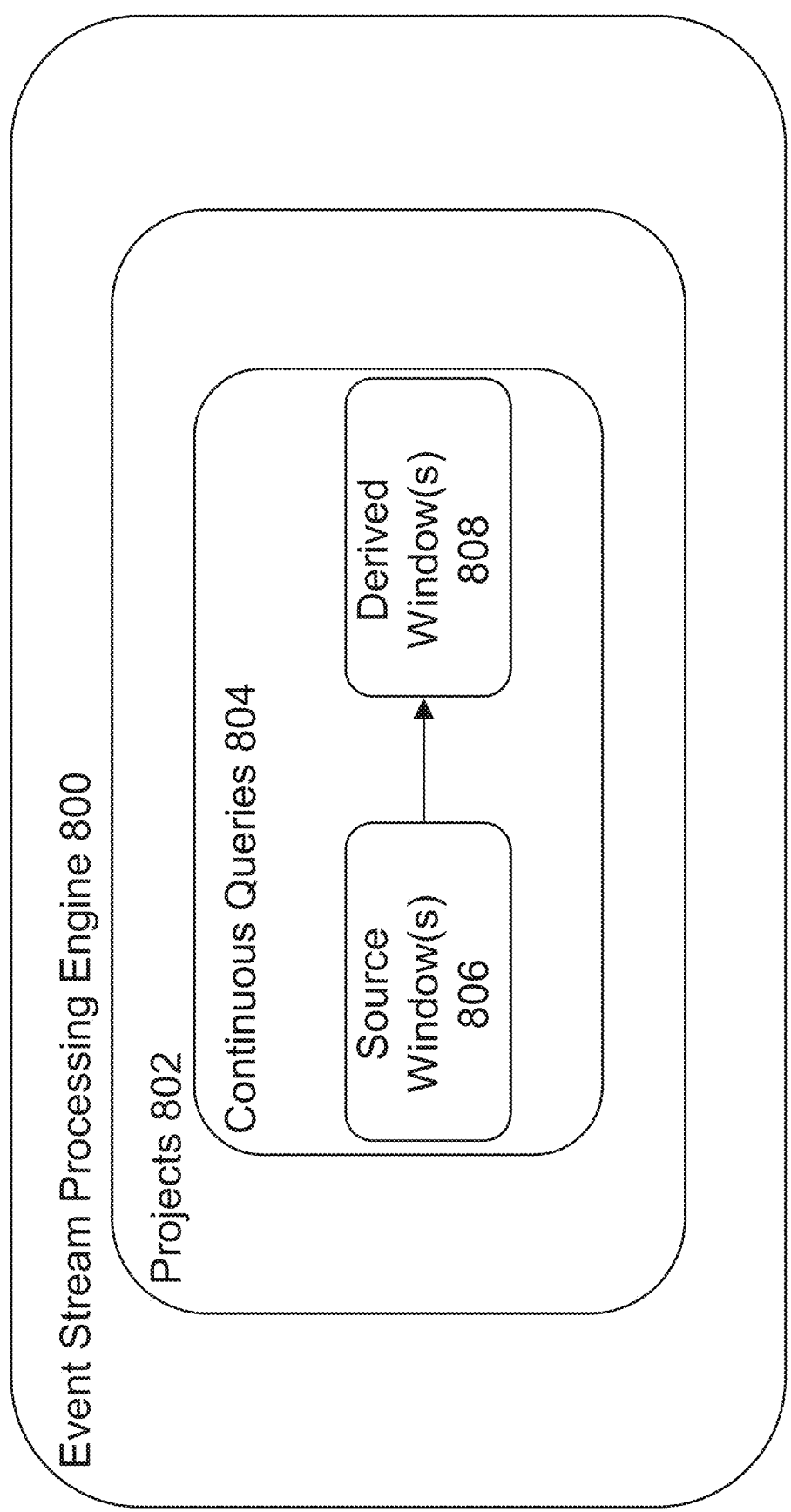
FIG. 8 illustrates a block diagram including components of an Event Stream Processing Engine (ESPE), according to at least one embodiment of the present technology.
Figure 9:
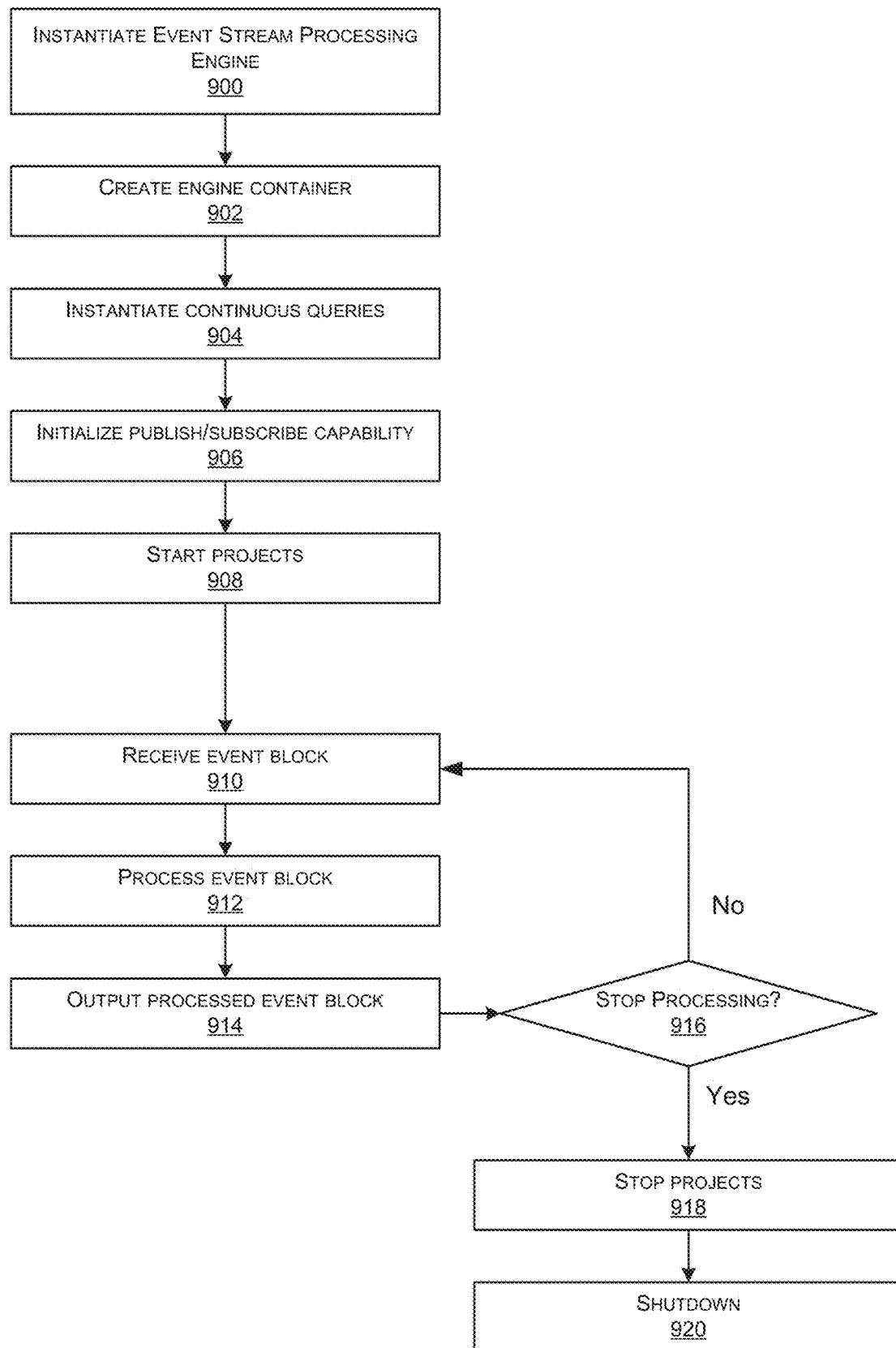
FIG. 9 illustrates a flow chart showing an example process including operations performed by an event stream processing engine, according to at least one embodiment of the present technology.
Figure 10:
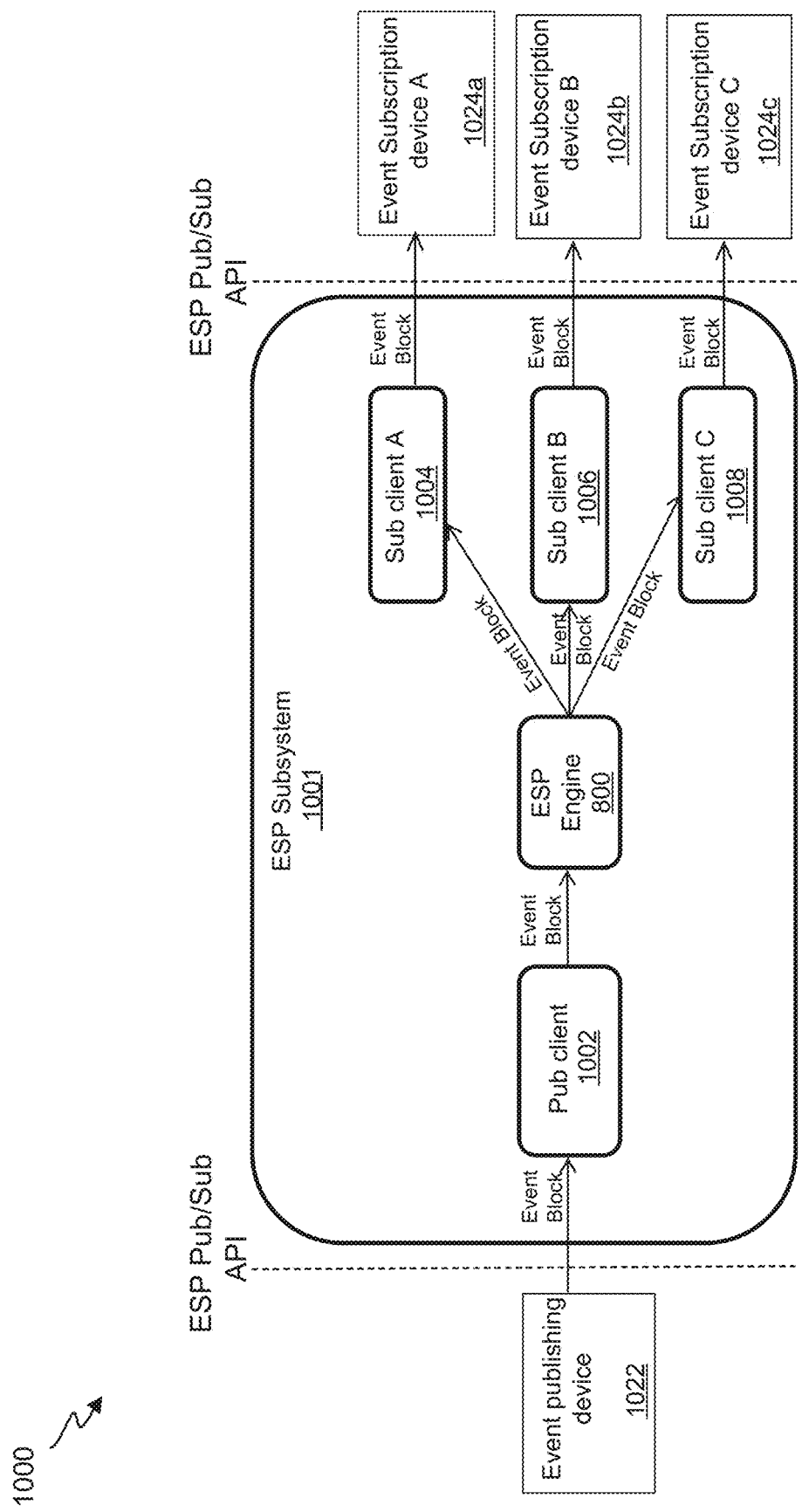
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
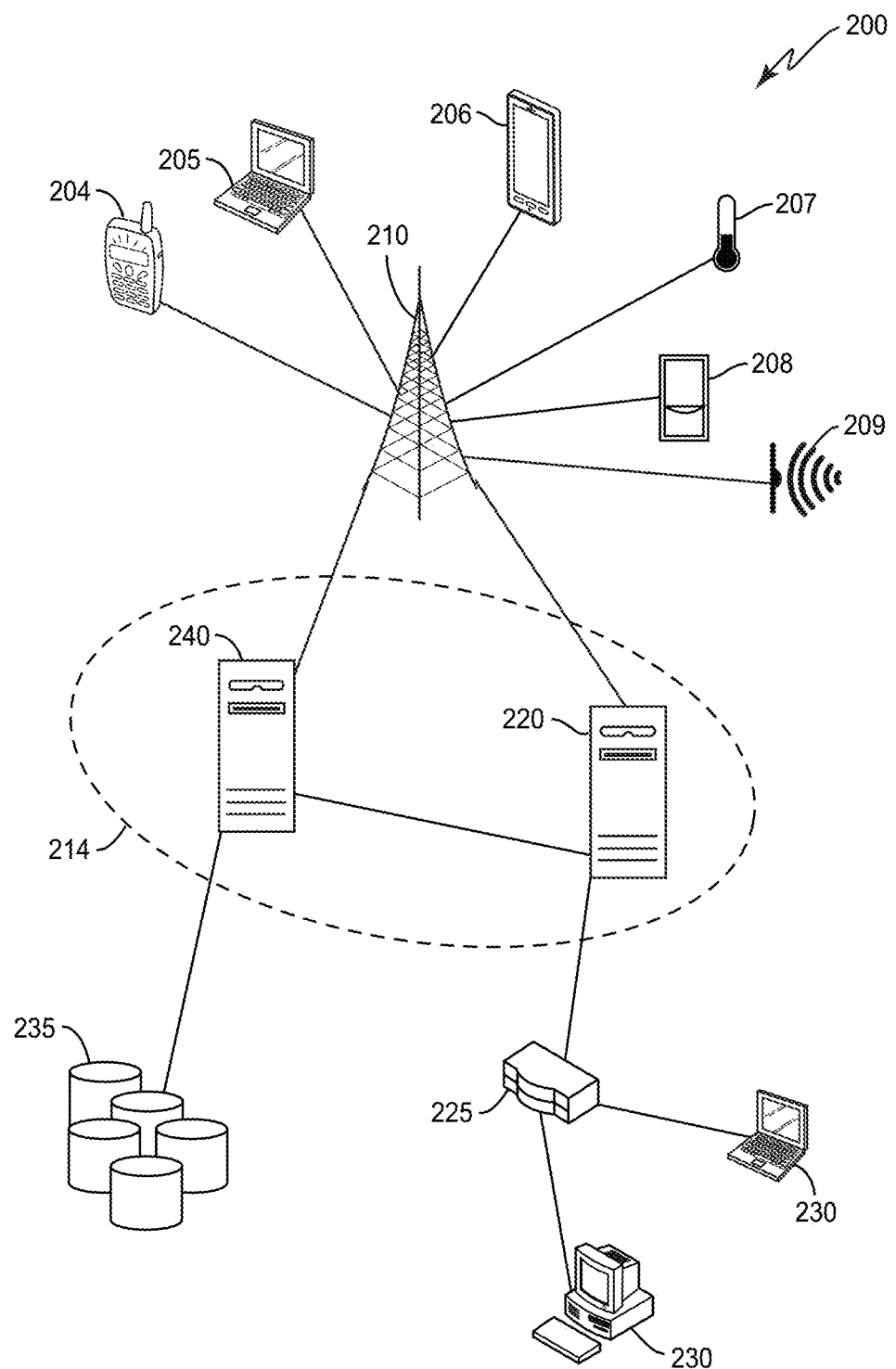
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
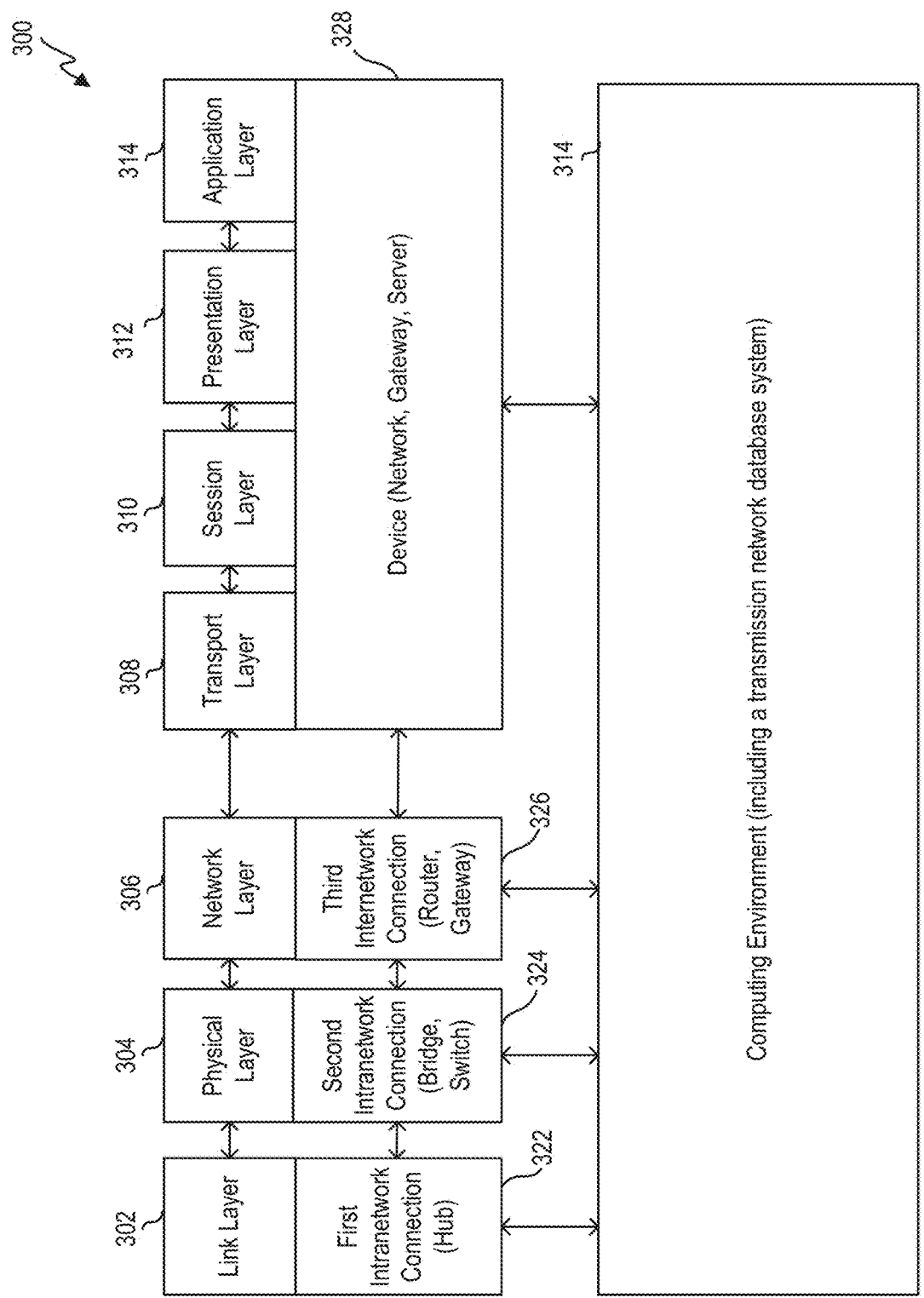
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
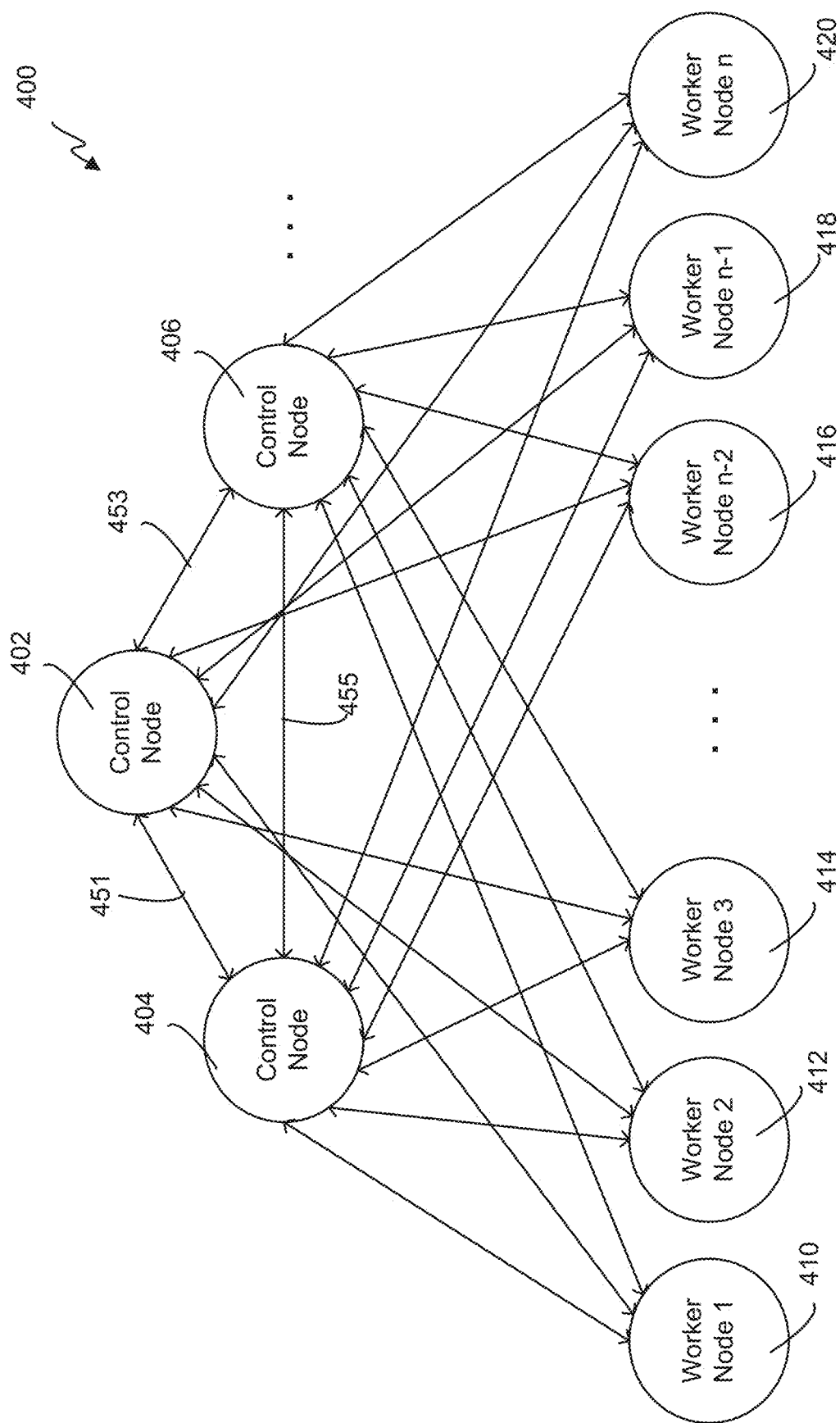
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
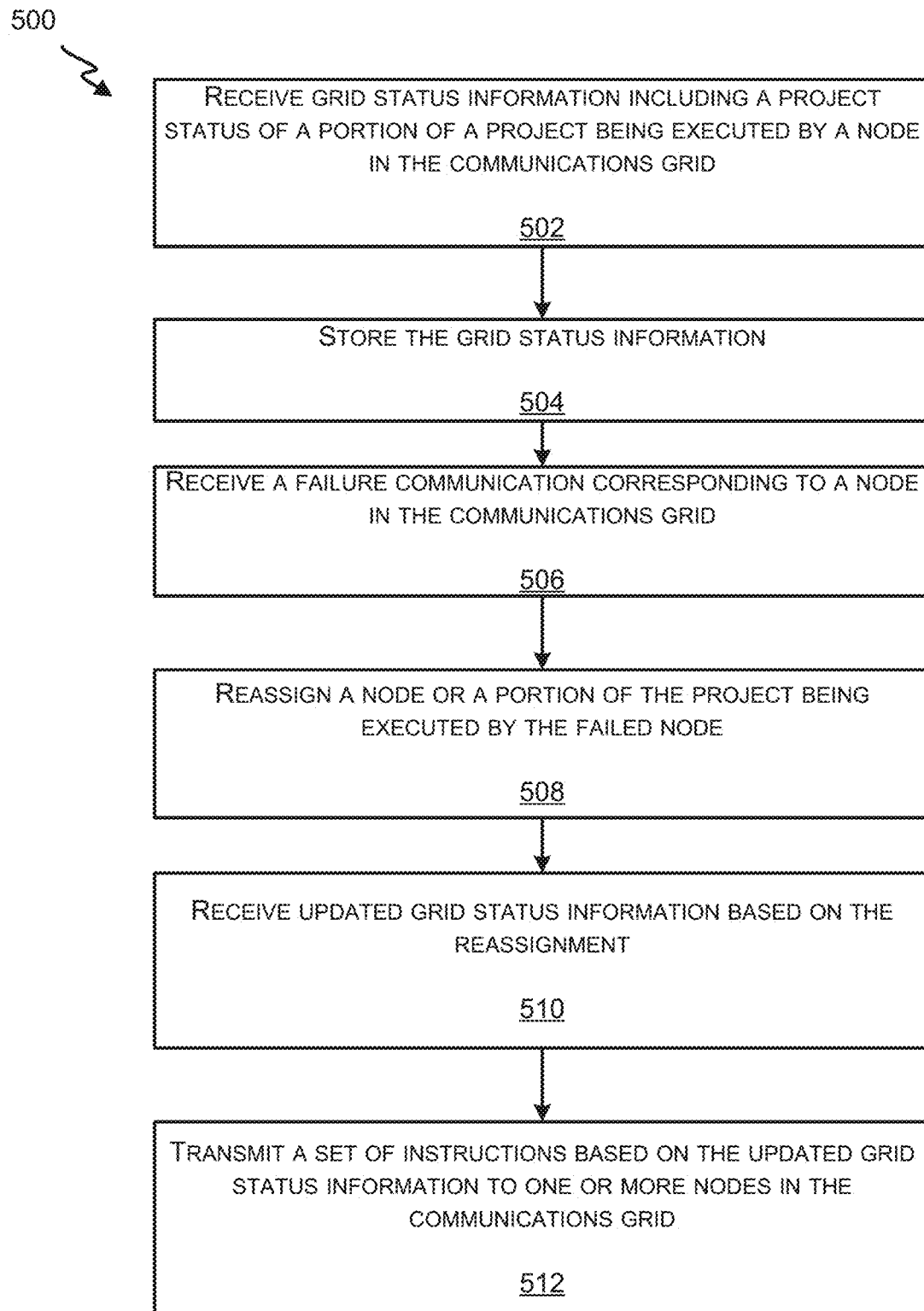
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
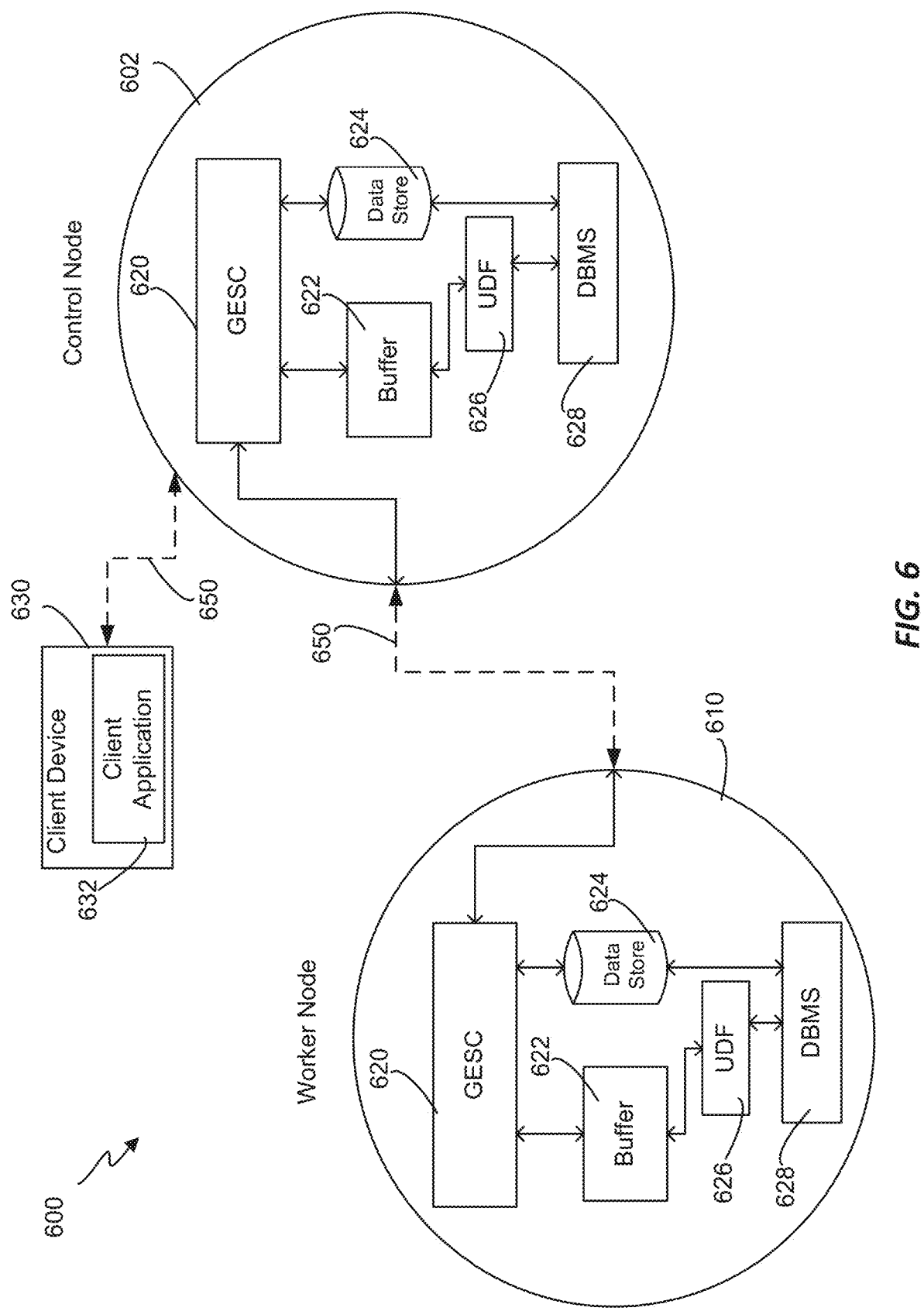
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
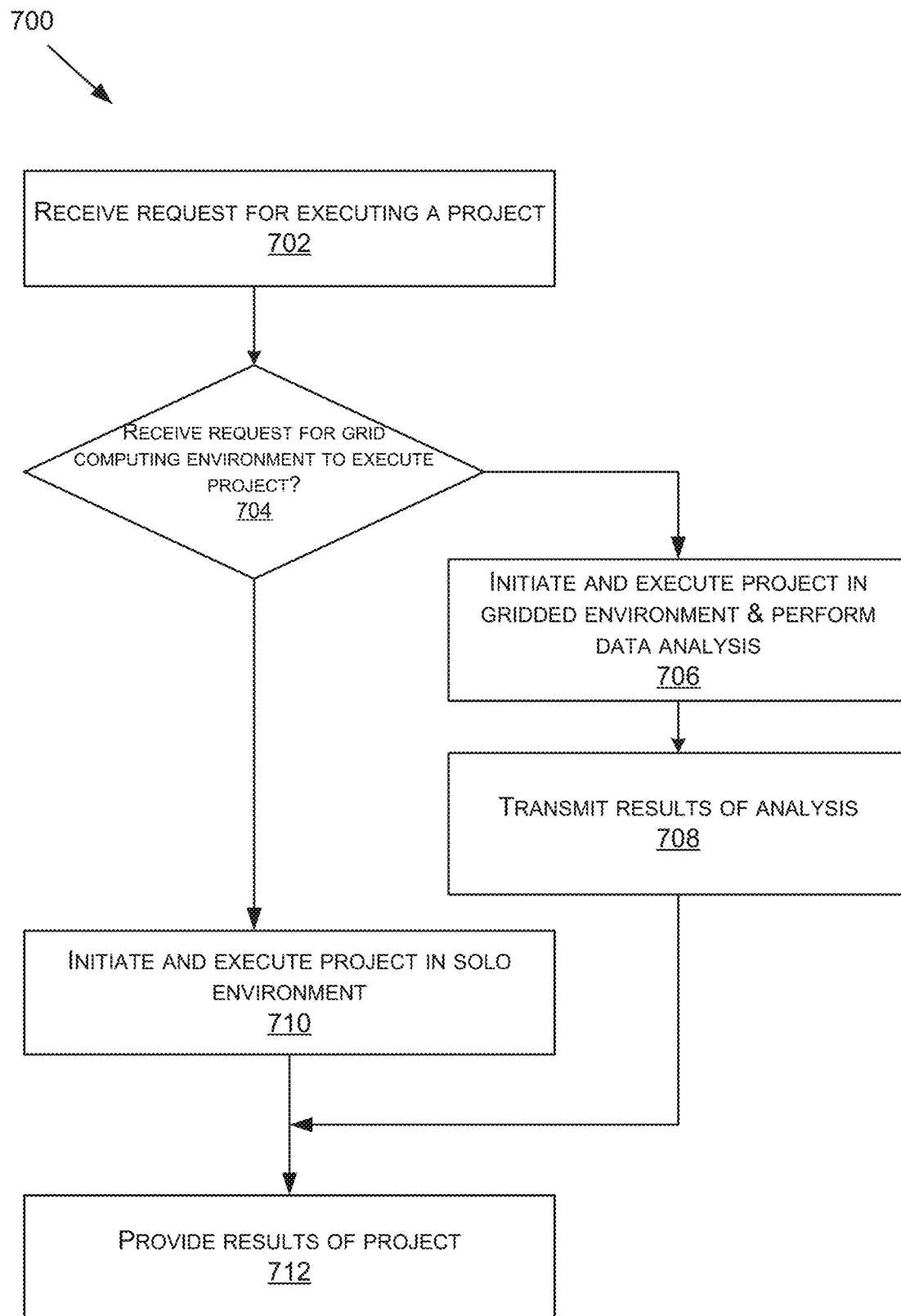
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
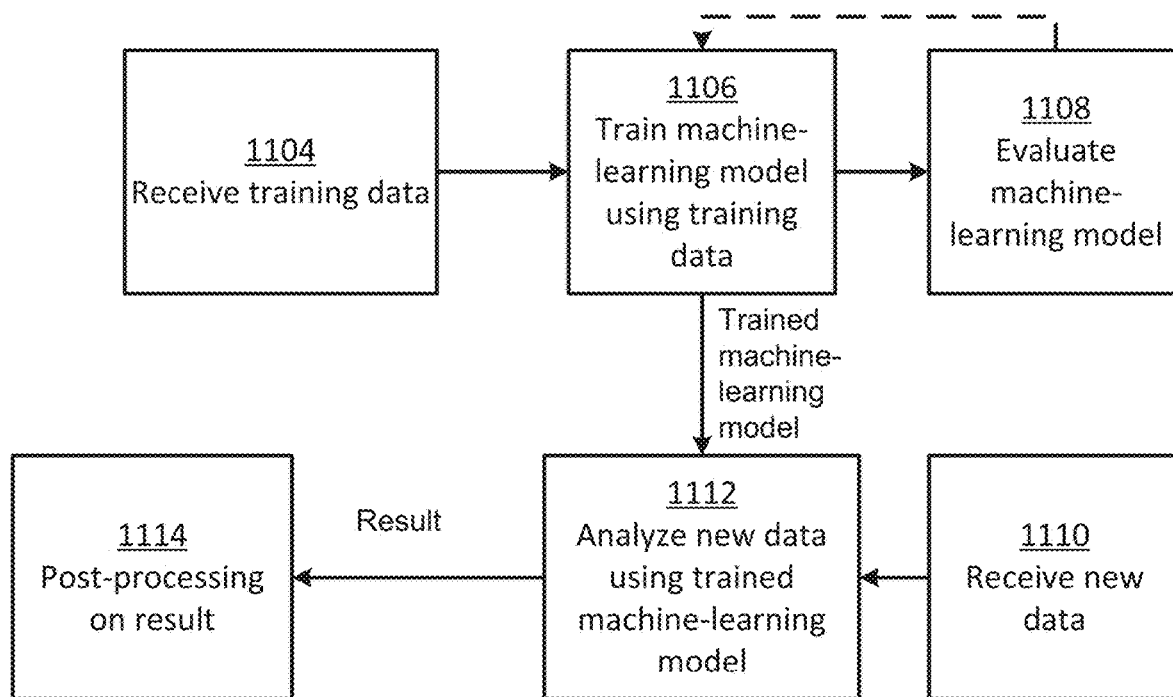
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
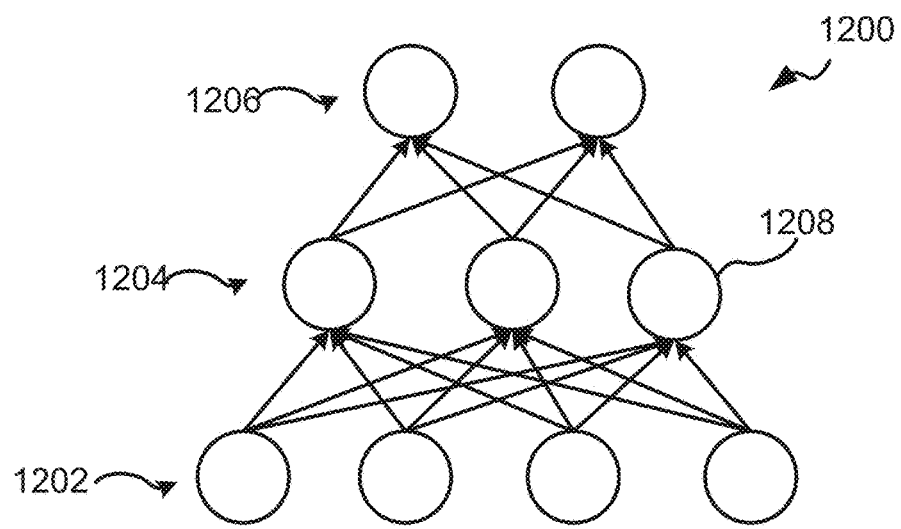
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
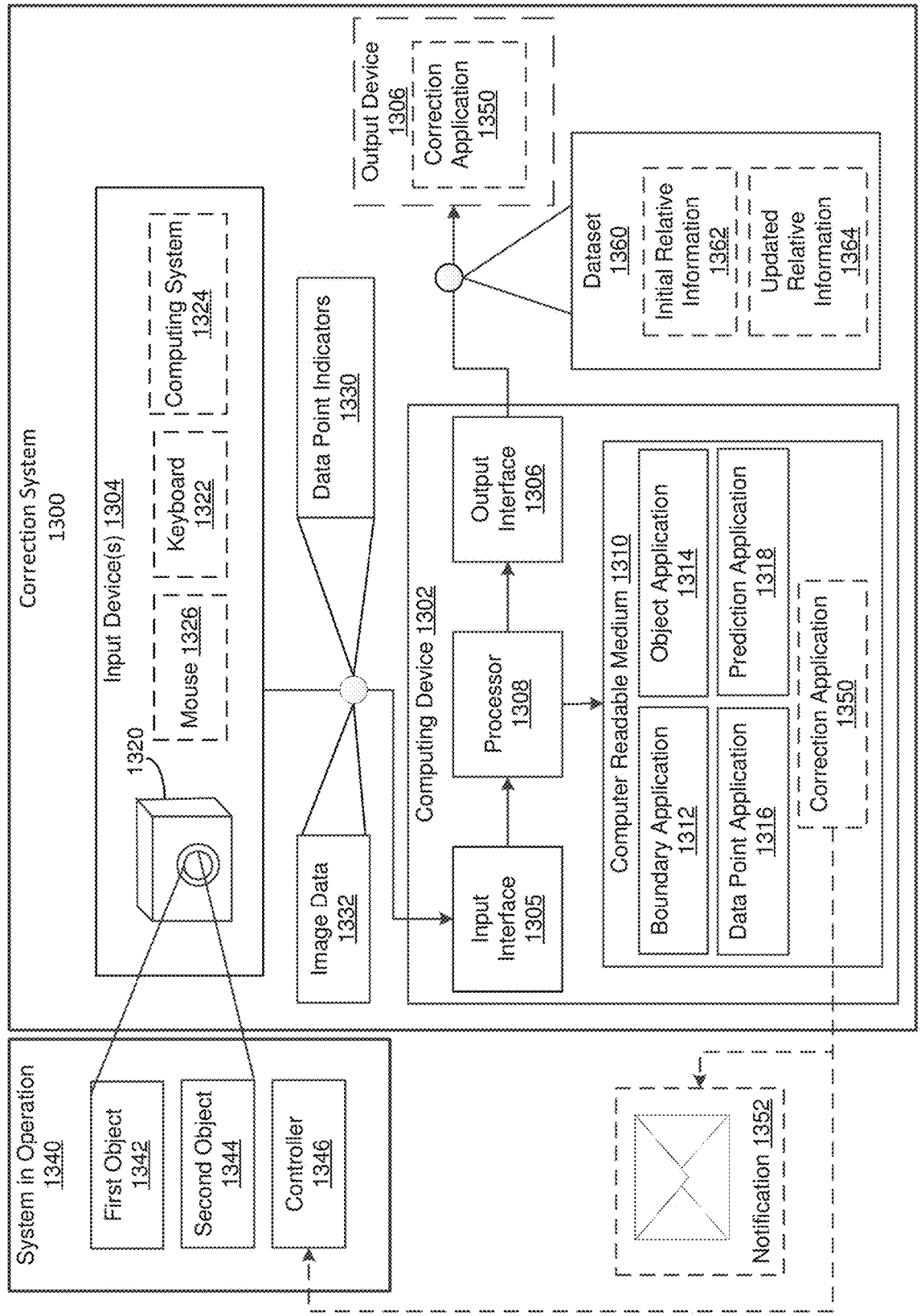
FIG. 13 illustrates an example of a block diagram for generating and outputting a dataset comprising relative information between objects in a system in operation in at least one embodiment of the present technology.

FIG. 13 illustrates a block diagram for generating and outputting a dataset 1360 comprising relative information between objects (e.g., first object 1342 and second object 1344) in a system in operation 1340. The system in operation 1340 could be, for example, a manufacturing system with multiple objects being manufactured.

In one or more embodiments, a correction system 1300 is used to determine whether the system in operation 1340 needs correction in some respect (e.g., if objects on a conveyer belt have moved too close to each other and are in danger of crashing or otherwise jamming the system). A control could be used to prevent an unplanned event in the manufacturing system like equipment failures from jams that triggers unplanned maintenance and might incur additional costs (e.g., from downtime). Downtimes constitute the single largest source of loss in production for any manufacturing industry.

The correction system 1300 comprises one or more input devices 1304 for receiving information regarding the system in operation 1340. The correction system 1300 includes a computing device 1302 for generating a dataset 1360 regarding the system in operation 1340. In one or more embodiments, this dataset 1360 can be output to an output device 1370. Optionally, in one or more embodiments, this output device 1370, or the computing device 1302 itself, triggers a control to correct an operation of a system in operation 1340 (e.g., by executing correction application 1350).

The correction system 1300 is configured to exchange information between devices in the system (e.g., via wired and/or wireless transmission). For example, a network (not shown) can connect one or more devices of correction system 1300 to one or more other devices of correction system 1300. Alternatively, or additionally, one or more devices in the correction system 1300 are integrated together.

One or more input devices 1304 are used to capture image data 1332 regarding the system in operation 1340. The input devices 1304 may include an image capture device 1320 capturing images at different time points of a system in operation. For instance, the image capture device 1320 may be a camera, video camera, camcorder, etc. and the system in operation may have one or more objects (e.g., first object 1342 and second object 1344) within view of the image capture device 1320. For instance, the objects could be products on a manufacturing conveyer belt and the image capture device 1320 may be positioned to view a section of the conveyer belt. In other examples, the objects could be vehicles passing on a highway or packages passing through a sorting room. The image data 1332 may represent different images captured by the image capture device 1320. For instance, the image data may comprise multiple data points that make up the electronic representation of images captured by the image capture device 1320.

In one or more embodiments, the input devices 1304 include other devices (e.g., a computing system 1324, a mouse 1326, or keyboard 1322) for user input regarding the image data (e.g., identification of data points in the image). The one or more input devices 1304 could include different or other devices not shown (e.g., a display, a track ball, a keypad, one or more buttons, a sensor, a phone, etc.). Alternatively, or additionally, the other input devices are integrated with the image capture device 1320.

In one or more embodiments, the computing device 1302 receives information from input device 1304 via input interface 1305. For instance, a computing device 1302 receives the image data 1332 and receives data point indicators 1330. The data point indicators 1330 include an indication of user-identified data points in the image data 1332. For instance, the data point indicators 1330 may indicate an image coordinate location for each of the user-identified data points in a coordinate system associated with an image. The user identified data points identify the first object 1342 and the second object 1344.

In one or more embodiments, the computing device outputs information (e.g., to an output device 1370). Output interface 1306 provides an interface for outputting information (e.g., one or more components of dataset 1360) for review by a user and/or for use by another application (e.g., correction application 1350) or device or multiple applications or devices. For example, Output interface 1306 may interface with various output technologies including, but not limited to, a display, a printer, data storage, or another computing device or system.

In one or more embodiments, the output device 1370 may be a computing device that analyzes the dataset 1360 (e.g., using a separate model of the system in operation 1340) to identify collisions, orientation issues, or other issues indicated by the dataset 1360 regarding the objects in the system of operation 1340. For instance, the correction application 1350 may comprise instructions to generate a model of the system in operation 1340 (e.g., based on specifics of a manufacturing plant system). This model can be used to trigger alerts (e.g., notification 1352) or take proactive corrective action (e.g., interfacing with a controller 1346 for the system in operation 1340). Alternatively, or additionally, such a correction application 1350 could be integrated with computing device 1302 and one or more components of the dataset 1360 are output (e.g., via output interface 1306) as part of a corrective action (e.g., accompanying or in a notification 1352 or a message to controller 1346).

In an alternative embodiment, the same interface supports both input interface 1305 and output interface 1306. For example, a touch screen provides a mechanism for user input and for presentation of output to the user. Alternatively, the input interface 1305 has more than one input interface that uses the same or different interface technology. Alternatively, or additionally, the output interface 1306 has more than one output interface that uses the same or different interface technology.

Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 operably couples with input interface 1305, with output interface 1306 and with computer readable medium 1310 to receive, to send, and to process information. Processor 1308 in one or more embodiments can retrieve a set of instructions from a permanent memory device and copy the instructions in an executable form to a temporary memory device that is generally some form of RAM.

In one or more embodiments, computer-readable medium 1310 stores instructions for execution by processor 1308. For example, computer-readable medium 1310 could comprise instructions for a boundary application 1312 for determining a boundary of a first object in an image of the image data 1332 (e.g., based on the data point indicators 1330). The computer-readable medium 1310 could comprise instructions for an object application 1314 for identifying an object defined by a determined boundary (e.g., a polygon associated with the object). A given object may have multiple boundaries defining polygon surfaces of the object.

The computer-readable medium 1310 could comprise instructions for a data point application 1316 for computing data values related to key points of a first image. A given key point could be indicated explicitly or implicitly by the data point indicators 1330. For instance, a given key point could be a derived key point (e.g., from user-identified data points). As an example, a user may identify the farthest points on the surface of an object, but the computing device may determine a key point that is at a center point to the identified objects. A key point could be an indication of a type of feature common to all the objects (e.g., a middle point or top left corner point) and associated with a particular data point in each of the objects. The computer-readable medium 1310 could comprise instructions for a prediction application 1318 to predict a change in computed values (e.g., in subsequent images of the image data 1332). The computer-readable medium 1310 could comprise instructions for a correction application 1350 to generate a data set for analysis for corrective action. In other embodiments, fewer, different, or additional applications can be stored in computer-readable medium 1310.

In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The applications can be integrated with other analytic tools (e.g., offered by SAS Institute Inc. of Cary, N.C., USA).

Embodiments may be advantageous in manufacturing plant surveillance where there is no known tool that serves an end to end process for object tracking using key points and derived engineering metrics from the unstructured video input. In one or more embodiments, artificial intelligence models are implemented to capture surveillance camera footage and detect and predict downtimes/failures. For example, live video data is input (e.g., to input interface 1305), and the computing device 1302 detects objects (e.g., products being manufactured), identifies key points, assign identifiers to track objects as they move along (e.g., on an assembly line), derives engineering metrics from this unstructured video feed, performs analysis on-the-fly to detect anomalies, and optimally alarms of a possible failure (e.g., by sending an alarm to operator or controllers). In one or more embodiments, the artificial intelligence models are robust enough to handle multiple camera angles and varying dimensions of the objects.

Embodiments will be described in the context of a manufacturing plant, as an example. However, embodiments can be applied in other domains such as, but not limited to, people tracking, surveillance camera monitoring, security, manufacturing, consumer packaged goods, transportation, packaging and shipping, and warehouse logistics.

In one or more embodiments, the correction system 1300 or one or more devices in the correction system 1300 (e.g., computing device 1302) implements a method as described herein (e.g., a method shown in FIGS. 14A-14C) for generating or outputting a dataset (e.g., dataset 1360).

Figure 14A:
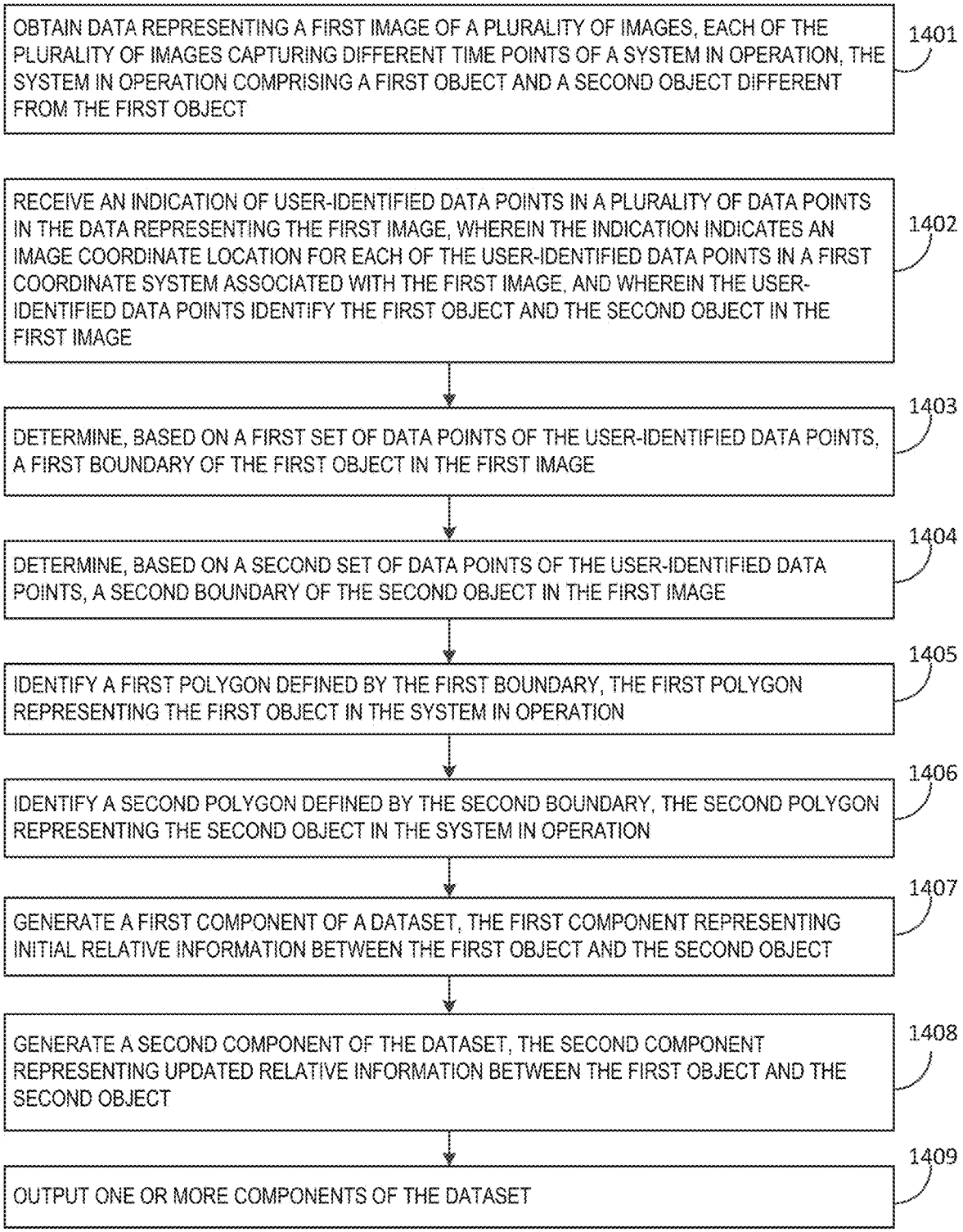
FIG. 14A illustrates an example of a flow diagram for generating and outputting a dataset comprising relative information between objects in a system in operation in at least one embodiment of the present technology.

FIG. 14A illustrates a method 1400 for generating and outputting a dataset comprising relative information between objects in a system in operation. FIGS. 15A-D illustrate object identification in an example image according to the method 1400.

In an operation 1401, the method 1400 comprises obtaining data representing a first image of a plurality of images. Each of the plurality of images captures different time points of a system in operation. FIG. 15A shows an example of a video image 1500 of boards on a conveyor belt of a manufacturing plant. In the method 1400 the system in operation comprises a first object and a second object (board 1502 and board 1504). The first object is different than the second object in that it is a different board and a different position within the manufacturing process. However, otherwise the boards would appear very similar and difficult to track and distinguish. More than two objects are possible (e.g., other boards shown within the video image 1500). In other embodiments, the system in operation could comprise only one object.

In an operation 1402, the method 1400 comprises receiving an indication of user-identified data points in a plurality of data points in the data representing the first image. The indication indicates an image coordinate location for each of the user-identified data points in a first coordinate system associated with the first image. The user-identified data points identify the first object and the second object in the first image. FIG. 15B shows an example of user-identified data points 1520 for board 1502. In one or more embodiments, a computing system (e.g., computing device 1302) receives user-identified data points (e.g., user-identified datapoints 1520) for each corner of an object shown in an image (e.g., board 1502 in video image 1500).

In an operation 1403, the method 1400 comprises determining, based on a first set of data points of the user-identified data points, a first boundary of the first object in the first image. FIG. 15C shows an example boundary 1540 for board 1502. In this example the bounding box formed by the boundary 1540 has a rectangular shape for an object that appears non-rectangular in video image 1500.

In an operation 1404, the method 1400 comprises determining, based on a second set of data points of the user-identified data points, a second boundary of the second object in the first image.

In an operation 1405, the method 1400 comprises identifying a first polygon defined by the first boundary. The first polygon represents the first object in the system in operation. In one or more embodiments, a you only look once (YOLO) detection algorithm is implemented on the rectangular bounding box in a given image to identify a polygon. Using this algorithm, a computing system can identify a non-rectangular shape in a given image corresponding to the non-rectangular shape in a previous image. As shown in FIG. 15C the bounding box is not necessarily tight to the polygon or the datapoints within the bounding box to ensure that the object or a polygon representing the object is within the bounding box. For instance, the computing system may determine a rectangular bounding box for a polygon by extrapolating corners for the rectangular bounding box based on determining a maximum distance between one or more of the user-identified data points, and providing an offset from any corners of the first object.

FIG. 15D shows an example polygon 1560. As shown the example polygon 1560 corresponds to the object as it appears in the video image 1500. In this example, the polygon 1560 is distorted from the original rectangular shape of the object to have a non-rectangular shape (e.g., a trapezoid shape) in the video image 1500. The distortion could be due, for example, to an angle of the recording device that capture the image.

In an operation 1406, the method 1400 comprises identifying a second polygon defined by the second boundary. The second polygon represents the second object in the system in operation.

In an operation 1407, the method 1400 comprises generating a first component of a dataset. The first component represents initial relative information between the first object and the second object.

In an operation 1408, the method 1400 comprises generating a second component of the dataset. The second component represents updated relative information between the first object and the second object.

In an operation 1409, the method 1400 comprises outputting one or more components of the dataset.

In one or more embodiments, a computing system can compare the updated relative information to a predicted change for the relative information. Based on the comparison, the computing system can trigger a control to correct the system in operation. For instance, the trigger could comprise sending an electronic notification (e.g., notification 1352) or augmenting the operation of the system (e.g., by sending a notification to a controller 1346).

Figure 14B:
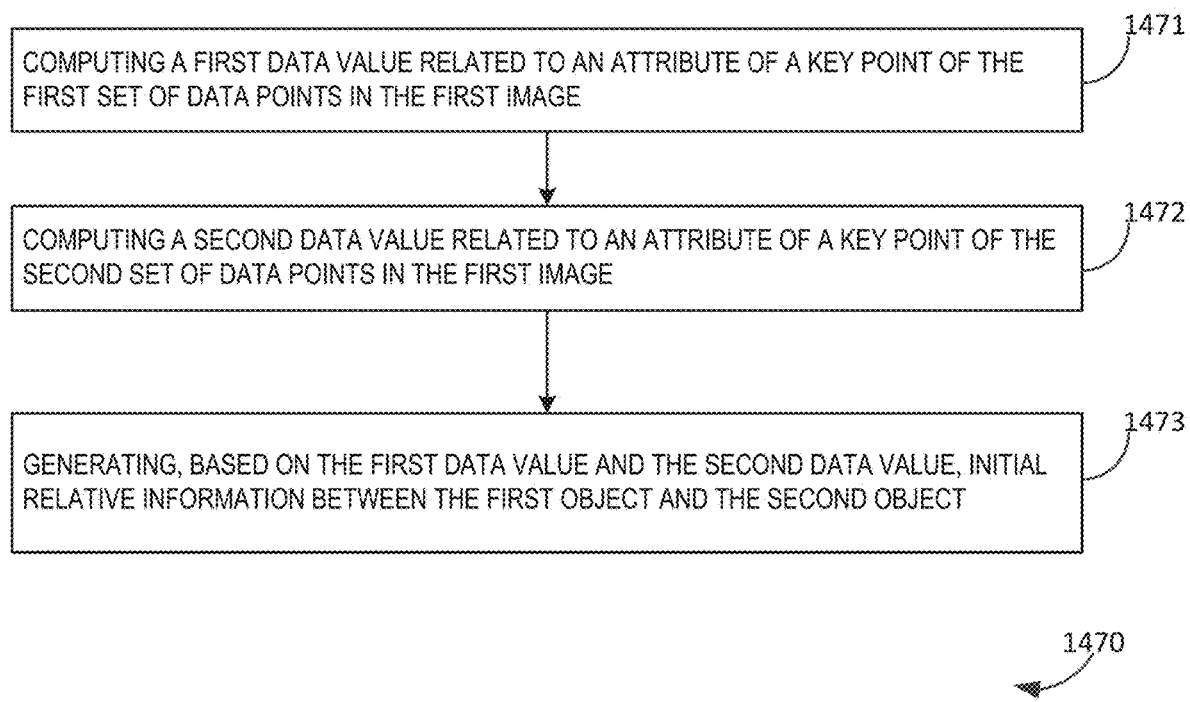
FIG. 14B illustrates an example of a flow diagram for generating a dataset representing initial relative information between objects in a system in operation in at least one embodiment of the present technology.

FIG. 14B illustrates an example method 1470 for generating a dataset representing initial relative information between objects in a system in operation.

In an operation 1471, the method 1470 comprises computing a first data value related to an attribute of a key point of the first set of data points in the first image. The attribute could indicate information about a polygon associated with the key point (e.g., a velocity, acceleration, size, or orientation of the first polygon).

In an operation 1472, the method 1470 comprises computing a second data value related to an attribute of a key point of the second set of data points in the first image (e.g., a velocity, acceleration, size, or orientation of the second polygon).

In an operation 1473, the method 1470 comprises generating, based on the first data value and the second data value, initial relative information between the first object and the second object. This could indicate information such as a current relative position between the objects.

Figure 14C:
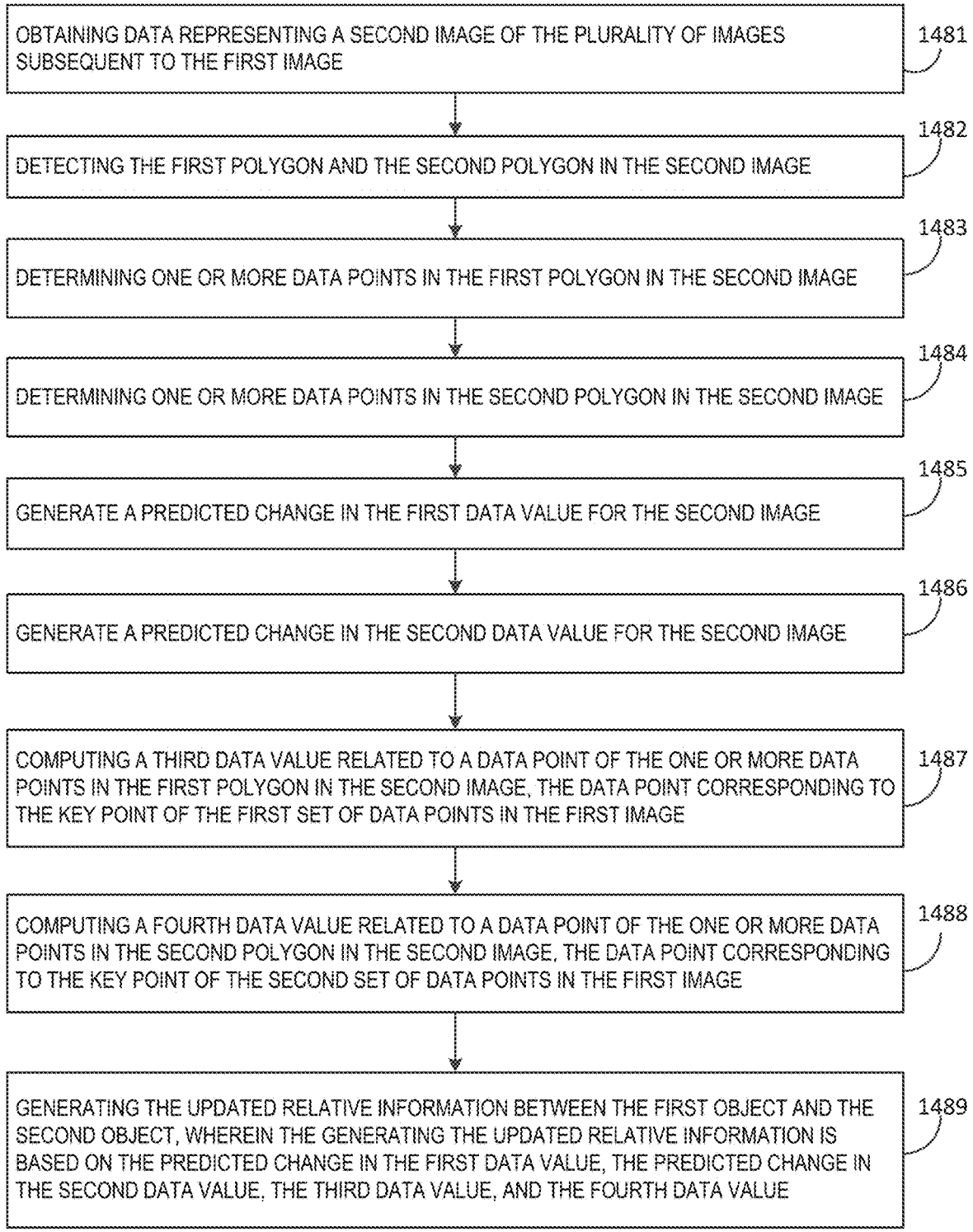
FIG. 14C illustrates an example of a flow diagram for generating a dataset representing updated relative information between objects in a system in operation in at least one embodiment of the present technology.

FIG. 14C illustrates a method 1480 for generating a dataset representing updated relative information between objects in a system in operation.

In an operation 1481, the method 1480 comprises obtaining data representing a second image of the plurality of images subsequent to the first image.

In an operation 1482, the method 1480 comprises detecting the first polygon and the second polygon in the second image. This type of detection may be difficult because the object may not appear the same in each image (e.g., due to issues with different video feeds or environments). In one or more embodiments, the computing system detects a given polygon for a given object in the second image by training, in an overlapping time period, an object detection model on a previous boundary for a given object and a data point detection model.

In one or more embodiments, the computing system may label objects with the same identifier to aid in tracking. For example, computing system may determine an additional boundary for the first object in the second image. The computing system may generate a data set representing pixels within the first boundary and the additional boundary. However, the computing device is able to label, in the data set, pixels within the additional boundary with a same identifier as pixels within the first boundary even though the pixels within the additional boundary have a different pixel resolution or pixel coding than pixels within the first boundary. Regardless, of the detection method, in an operation 1483, the method 1480 comprises determining one or more data points in the first polygon in the second image and in an operation 1484, the method 1480 comprises determining one or more data points in the second polygon in the second image.

In an operation 1485, the method 1480 comprises generating a predicted change in the first data value for the second image. In an operation 1486, the method 1480 comprises generating a predicted change in the second data value for the second image. For instance, Kalman filtering can be used to predict temporal change.

In an operation 1487, the method 1480 comprises computing a third data value related to a data point of the one or more data points in the first polygon in the second image. The data point corresponds to the key point of the first set of data points in the first image. For instance, this computing system may compute an actual change in the first data value to the third data value.

In an operation 1488, the method 1480 comprises computing a fourth data value related to a data point of the one or more data points in the second polygon in the second image. The data point corresponds to the key point of the second set of data points in the first image. For instance, this computing system may compute an actual change in the second data value to the fourth data value.

In an operation 1489, the method 1480 comprises generating updated relative information between the first object and the second object. The generating the updated relative information is based on the predicted change in the first data value, the predicted change in the second data value, the third data value, and the fourth data value.

In one or more embodiments, the predict change and actual changes are compared to determine whether to trigger a control of the system in operation.

FIGS. 15A-D illustrate object identification in an image and have been described in the context of a method 1400. As shown in FIGS. 15A-D, object identification can be performed on raw video footage. This approach contrasts to traditional oversight of manufacturing that must rely on lasers or sensors to supervise objects. Raw video footage presents challenges for identifying an object across different image frames that may look different depending on the objects position. In one or more embodiments, a computing system (e.g., computing device 1302) extracts data representing an image from a real-time video feed comprising the plurality of images and generates a plurality of data models for identifying a polygon in images the data models may be generated by augmenting the extracted data setting as data model equivalent ones of the first polygon in the augmented extracted data. For instance, the computing device may augment the extracted data by performing color jittering, sharpening, lightening, flipping, changing one or more dimensions; and cropping an image represented by the extracted data.

FIG. 15B can be referred to as single-shot labeling in which images are labeled once and can be used to simultaneously train two deep learning (DL) models: a you only look once (YOLO) model and a key-points model. Since each bounding box can be cropped and saved, coordinates of key points can be computed relative to the bounding box. A YOLO model can be trained on original images with bounding box information and a key-points model can be trained on the cropped images with relative coordinates.

Figures 16A, 16B:
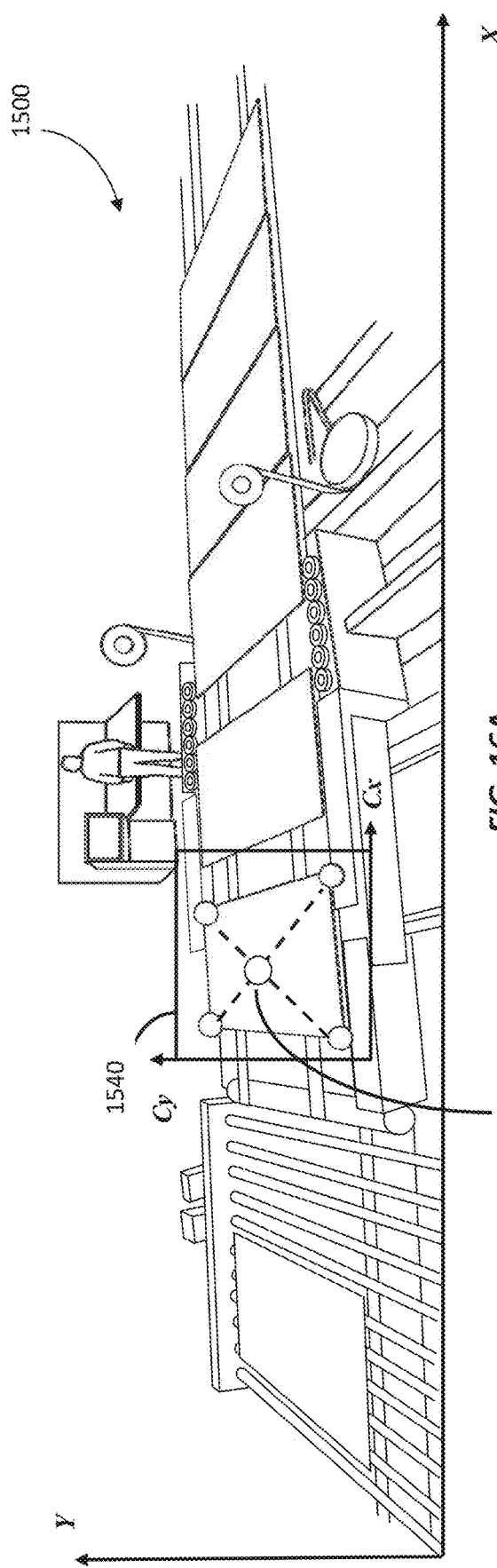
FIG. 16A illustrates an example of a derived data point in at least one embodiment of the present technology.
FIG. 16B illustrates an example of a derived data matrix in at least one embodiment of the present technology.

A key point could be associated with a user-identified data point or it could be a derived data point. FIG. 16A illustrates a derived data point 1600. The derived data point 1600 is at a midpoint of the user-identified datapoints as an example. Other derived data points are possible. For example, a derived data point could be at a midpoint of only a couple of the user-identified data points. The user identified data points and the derived data points in this example are encompassed in a cropped image location formed by the boundary 1540. This cropped image location can be separated from the video image 1500 and have its own coordinate system.

As shown in FIG. 16B a data matrix 1650 shows information regarding the datapoints or derived datapoints generated and stored in a dataset (e.g., an object identifier or position). The position can be computed relative to an image coordinate system (e.g., an X, Y position of video image 1500) or computed relative to a cropped image coordinate system (e.g., Cx, Cy position of a bounding box within the boundary 1540). This is merely given as an example, position can be determined in a location in the image coordinate system, a cropped image coordinate system, or both for derived or user-identified datapoints.

Thus, cropped areas encompassing the polygon can be cropped from each image and a key point location can be defined in the cropped image.

In one or more embodiments data values are computed related to the attribute of the key point that is one of the user-identified data points or one of the derived key points. Data values (e.g., velocity or acceleration) can then be computed based on an image coordinate system or location or a cropped image coordinate system or location and inserted into a dataset (e.g., that represents aspects of data matrix 1650).

For instance, the start position of derived data point 1600 can be used to determine a velocity after obtaining a second cropped area encompassing the polygon in a cropping from a second image. A computing device can determine a second cropped area image location in a second cropped area for one or more data points of the plurality of data points in the first polygon; and derive another data value based on the second cropped area image location.

FIGS. 16A and 16B are shown with respect to key points of a single object for example. However, data can be kept for each of several objects to derive relative information between objects.

Figures 17A, 17B:
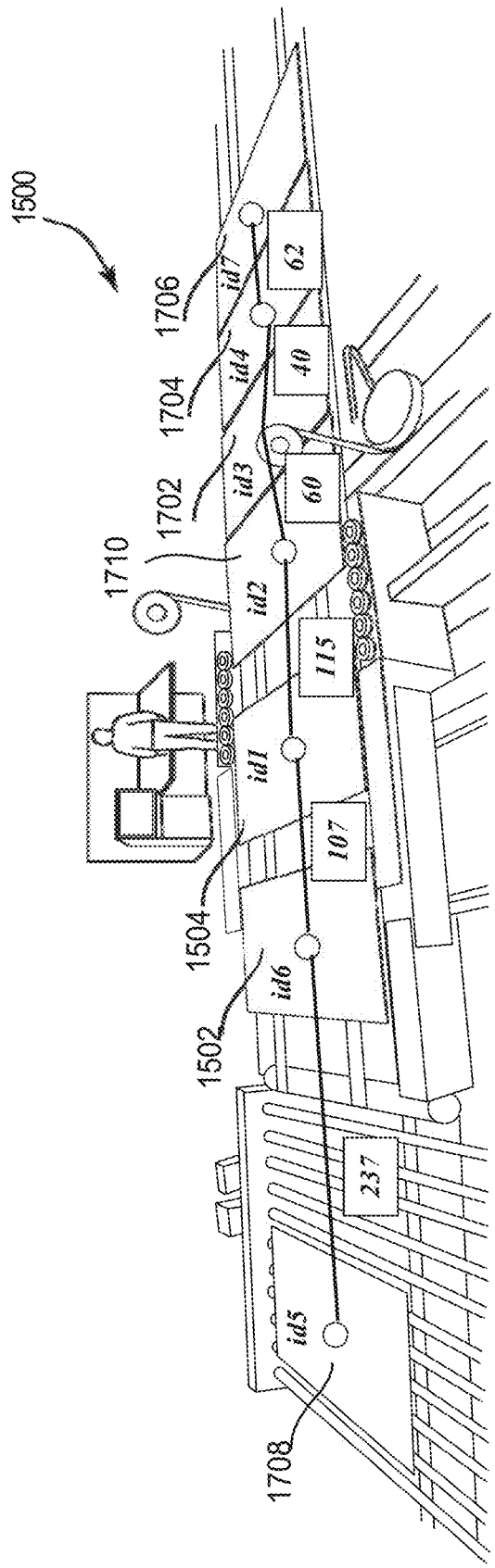
FIG. 17A illustrates an example of derived object information in at least one embodiment of the present technology.
FIG. 17B illustrates an example of derived object data matrix in at least one embodiment of the present technology.

FIG. 17A illustrates derived object information. In this example, a distance is shown between derived center points for boards 1502, 1504, 1702, 1704, 1706, 1708, and 1710. Tight polygons from key points prediction and Kalman filtering can be drawn around the objects and identifiers are assigned to objects to track them as the objects move (e.g., id1-id7). The lines connecting centers of the objects are used to measure distances between them.

FIG. 17B illustrates a derived object data matrix 1700. In this example, different information is associated with a given object. Information is associated with board 1502 regarding the object (e.g., an object label, size and position). Information regarding the object is also generated and associated with the object (e.g., velocity and acceleration). Information is also generated and associated with the object regarding the set of objects in which board 1502 is a part of (e.g., the number of objects). Further information can be derived based on the board 1502's relationship with other objects (e.g., a skew a distance to a forward object and a distance to a back object).

As shown in FIG. 17A, the centerpoint of object 1703 with id3 is obscured by an object in the manufacturing plant. While the centerpoint may be viewable in a previous image and a later image, currently it is obscured. In one or more embodiments, a computing system (e.g., computing device 1302 or correction system 1300) is able to compute a missing attribute of a data point due to an obstruction in a view of the system in operation. For instance, in this case the system is manufacturing many products and there is a predetermined pathway for a given product during manufacture. The computing system can predict a change based on the predetermined pathway. For instance, the computing system can predict a predicted change in a subsequent image that accounts for the obstruction. This preserves the relative information. In this case, the computing system has determined that there is only 40 cm between object 1702 and object 1704. This may indicate the objects are too close together and a collision is likely. In one or more embodiments, the computing system can trigger a control to correct an operation of the system in operation based on a comparison indicating that the given product has moved beyond a tolerance allowed in the predetermined pathway or predicted change based on the predetermined pathway.

In one or more embodiments, a predicted change is computed for one or more data values (e.g., a data value in data matrix 1650). For instance, a computing system may predict a predicted change in a data value by applying a Kalman filter to generate a data table of uncertainties for estimates of the predicted change.

FIG. 18 shows a table 1800 of uncertainties for a first position of key point 1 as an example. As shown the table of uncertainties predicts a change in a data value and the likelihood of that change. The prediction could be based on a model for the system in operation. For instance, as shown in table 1800 the most likely change will be a board will continue advancing along the conveyer belt one unit forward with no change in the y direction. However, it is possible the board will move up or down (e.g., if something blocks its path and causes the board to turn). This creates a degree of uncertainty in the objects path. A Kalman filter allows a weighted prediction in view of the uncertainty given the various possible changes.

Table 1850 shows an updated table of uncertainties after a change in the object's location is observed. In this case the object did in fact have movement in the x and y direction. Now the uncertainties have changed or updated in view of the actual measured movement of the object as well as the model for the system in operation. The estimate can now be updated based on a measured data value and a weighted average derived from the data table of uncertainties for predicting another value different from the previous data values.

Figure 19:
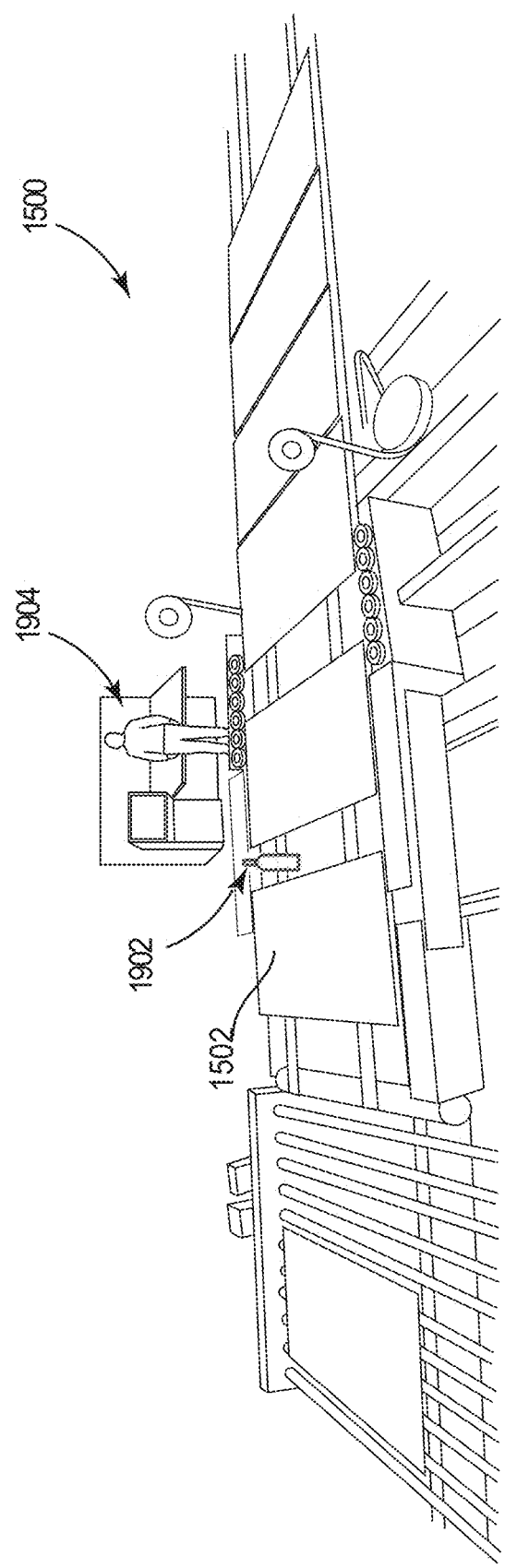
FIG. 19 illustrates an example of controlling a system in operation in at least one embodiment of the present technology.

FIG. 19 illustrates controlling a system in operation. In one or more embodiments, a computing system may determine (e.g., based on generated data for the objects), to trigger a control to correct an operation of the system. In one or more embodiments, the computing system triggers a control to correct an operation of the system in operation by selectively storing data related to a particular object or different objects in images for further analysis of the operation of the system in operation. The system could be analyzed by a computing device to determine whether to correct an operation of the system in operation. The correction could be staging the data or analysis to an operator 1904 of the system for the operator's correction. In the same or different embodiments, a computing system triggers a control to correct the system in operation by stopping or augmenting the operation of the system in operation. For instance, as shown in FIG. 19, if an object is simply skewing, an electronic arm 1902 could be used by the computing system or operator 1904 to correct the object.

In one or more embodiments, the control is based on relative information (e.g., the objects are moving to close together or are moving together too quickly). In the same or different embodiments, the control is based on a comparison of an actual change to a predicted change in a computed value for a given key point for an object. Based on the comparison of the actual change to the predicted change, a computing system can determine a velocity, acceleration, size, or orientation of the first polygon, or one or more data points within the first polygon indicates to correct an operation of the system in operation.

Figure 20:
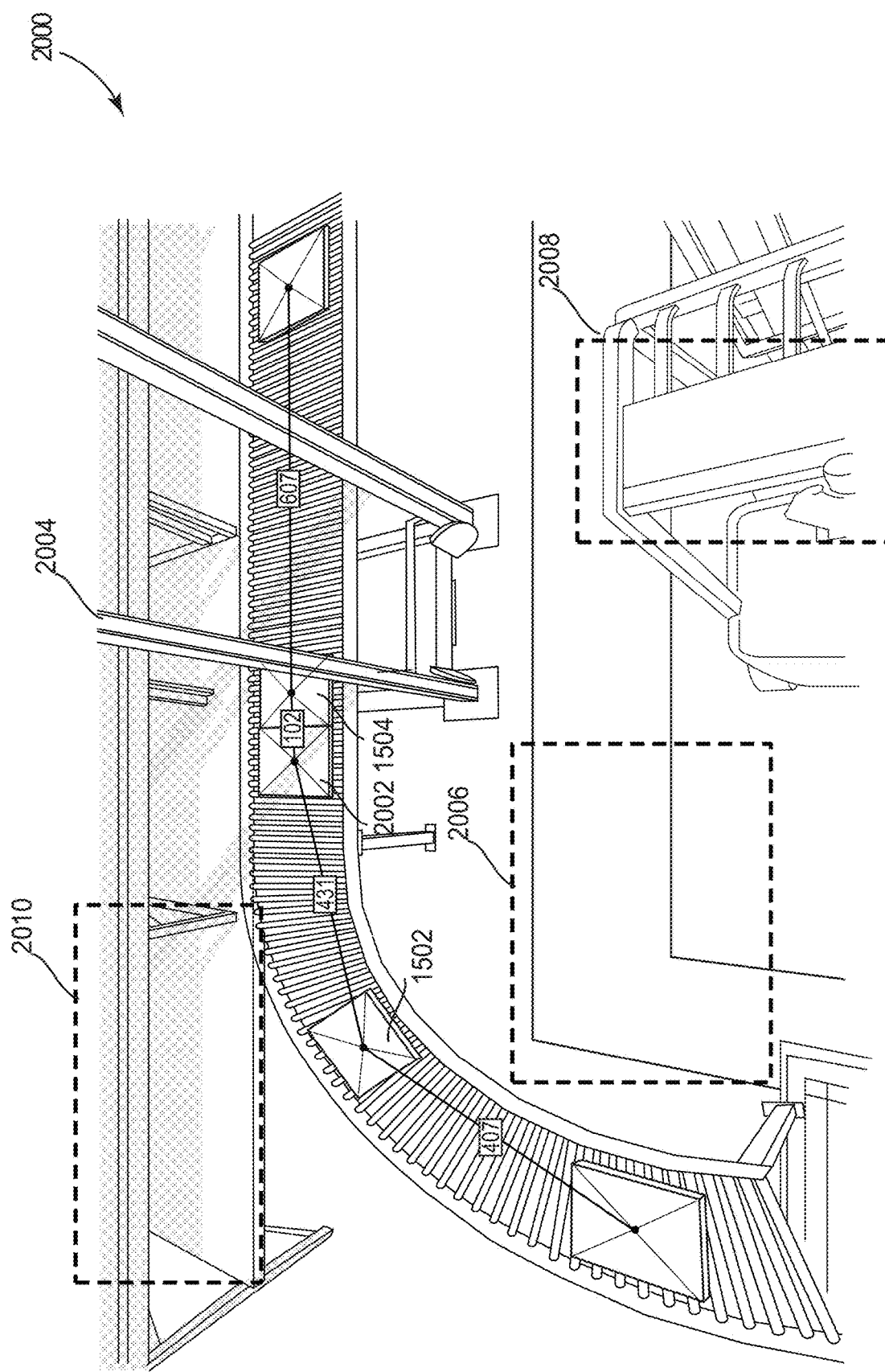
FIG. 20 illustrates an example of object and data point detection in at least one embodiment of the present technology.

FIG. 20 illustrates object and data point detection in an image 2000. As in video image 1500 boards are moving along a conveyor belt. FIG. 20 shows a second image 2000 (e.g., a camera or video image) for the boards 1502 and 1504 seen in a first video image 1500. These products in the subsequent image 2000 are tracked by assigning identifiers and metrics derived from the detected key points with respect to video image 1500.

In one or more embodiments, a computing system (e.g., computing device 1302 or correction system 1300) detects objects even in complex environments with objects of similar shape or shadow or across images from different cameras. In this second image, board 1502 and board 1504 look different from their original form in video image 1500. By modeling the environment, a computing system is also able to detect these objects in the later video image even though the objects may appear distorted or different in color (e.g., due to shadows or different coloring in the video image).

In one or more embodiments, the model or a user may provide information to the computing system regarding one or more attributes of an object (e.g., a pathway or shape of an object) to help in distinguishing an object from other similar polygons. For instance, rectangular shadow 2010, floor tile 2006, and lift 2008 will not be detected as part of the objects even though they present a similar rectangular shape. Different objects may also intervene between the objects and may need to be accounted for in relative information. For instance, object 2002 now appears between board 1502 and board 1504.

In one or more embodiments, the computing system is able to detect these objects that may be distorted by light or angle, or obstructed by other objects in the manufacturing environment. As shown in FIG. 20, object 1504 is now obstructed by post 2004. In this case, the computing system may have been provided with data points for each of the corners of object 1504. However, the computing system is able to determine one or more data points in a polygon corresponding to object 1504 in image 2000 by determining less corresponding data points as the user-identified data points. For instance, the computing system may only determine a midpoint of the object 1504 or a few corners.

Additionally, due to the changing image data, a computing system may need to select a granularity of the coordinate system associated with an image based on the size of the object. For instance, given the much larger image frame compared to the objects, an overly large granularity may not be able to distinguish between object 2002 and 1504. A YOLO detection algorithm implemented on a bounding box could involve selectively modifying the YOLO detection algorithm based on selectively setting the granularity.

Embodiments herein can be used to track objects of varying widths and lengths (e.g., boards of length 8 feet or 20 feet). They can also be used to track objects that change in some respect (e.g., a dimension). In one or more embodiments, a computing device (e.g., computing device 1302) predicts that an object will undergo a change to become two separate objects in the system in operation.

Figure 21:
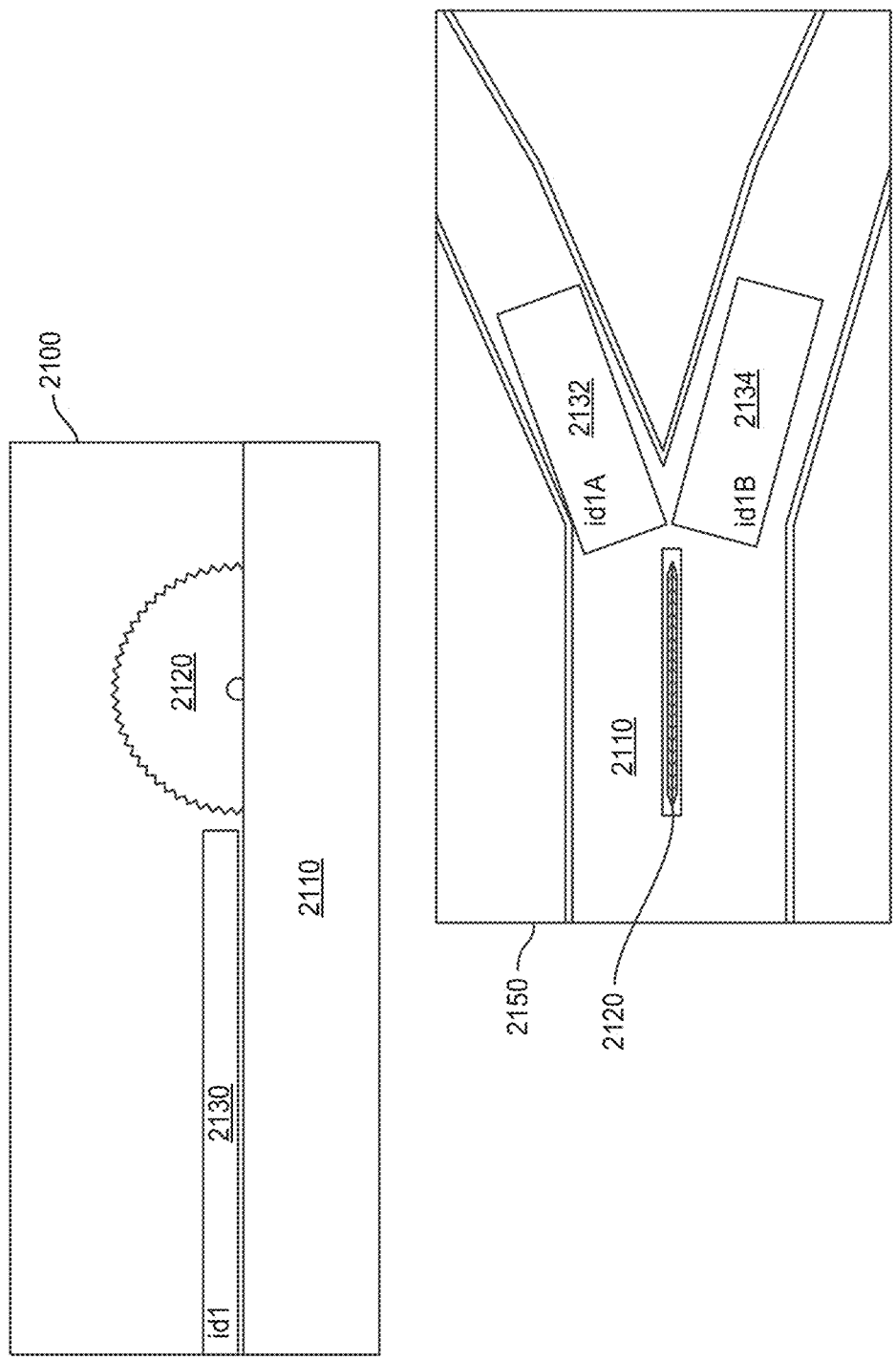
FIG. 21 illustrates an example of tracking of a changing object through different image captures in at least one embodiment of the present technology.

FIG. 21 illustrates tracking of an object 2130. The object in a first image 2100 is cut in half by a saw 2120 and appears as two objects—object 2132 and object 2134—in second image 2150. The width of the object 2130 changed from the first image 2100 to the second image 2150 because the object 2130 was cut in half by saw 2120. The resulting board could be identified as new objects 2132 and 2134 and/or an association with the original object maintained (e.g., by labeling them as still id1, but A and B).

In one or more embodiments, a computing system (e.g., computing device 1302) detects a first polygon (e.g., corresponding to object 2130) in a second image (e.g., image 2150) by detecting two detected polygons (e.g., corresponding to object 2132 and object 2134) each corresponding to components of the first polygon. The computing system assign identifiers (e.g., id1A and id1B) to each of the two detected polygons indicating its relationship to the first polygon in the first image (e.g., image 2100).

Figure 22:
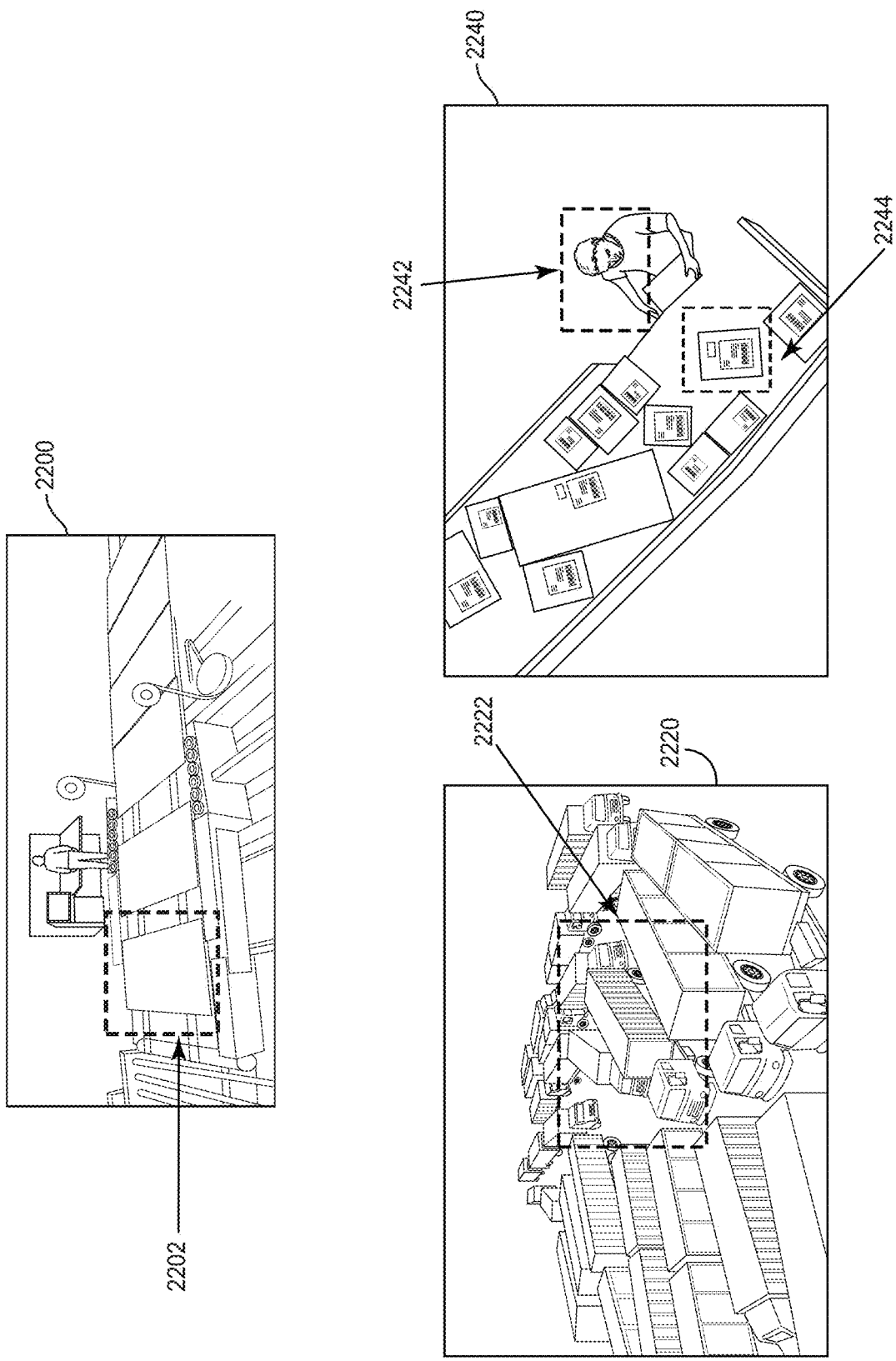
FIG. 22 illustrates an example of video feeds of systems in operations in at least one embodiment of the present technology.

FIG. 22 illustrates video feeds in other applications or domains. One or more embodiments herein were described with respect to a manufacturing environment or system (e.g., the one shown in video image 2200) with objects of manufacture like object 2202. However, embodiments herein are applicable to other systems in operations.

In one or more embodiments, the system in operation is a facial recognition system and the first object is a facial component. Video image 2240 shows facial tracking of an employee 2242. One or more embodiments herein could then be used to detect and track people or personal like the employee 2242. Key points could be identified by a user or derived by a computing system based on particular facial markers. A predetermined pathway for the employees or expected facial expressions is used to model and predict appropriate employee movements or responses.

In one or more embodiments, the system in operation is a transportation, system and an object tracked is a vehicle (e.g., a vehicle transporting a product). Video image 2220 shows a highway with vehicles passing by. The computing system could be used to detect and track a vehicle 2222 and its relationship to other vehicles to ensure appropriate delivery of a package. Key points could be identified or derived based on points on the vehicle. A predetermined pathway for the vehicle could be based on known information about the route the vehicle will take.

In one or more embodiments, the system in operation is a warehouse where products or packages are sorted or stored as shown in video image 2240. In one or more embodiments, an object (e.g., object 2244) is identified and tracked. A predetermined pathway for the vehicle could be based on known information about the expected path for the package. As shown in video image 2240 different models can be generated for the same video image (e.g., a facial recognition system model and package tracking system model).

In each of these examples, the objects identified and tracked could be similar (same truck or box) or different (different trucks, different box sizes). Embodiments described herein are able to handle both situations. It is also expected that the video image size may be different depending on the application (e.g., video image 2200 has different dimensions than video image 2240). Embodiments herein are able to handle different types of image data (e.g., using resizing or modifying a YOLO model).

Figure 23:
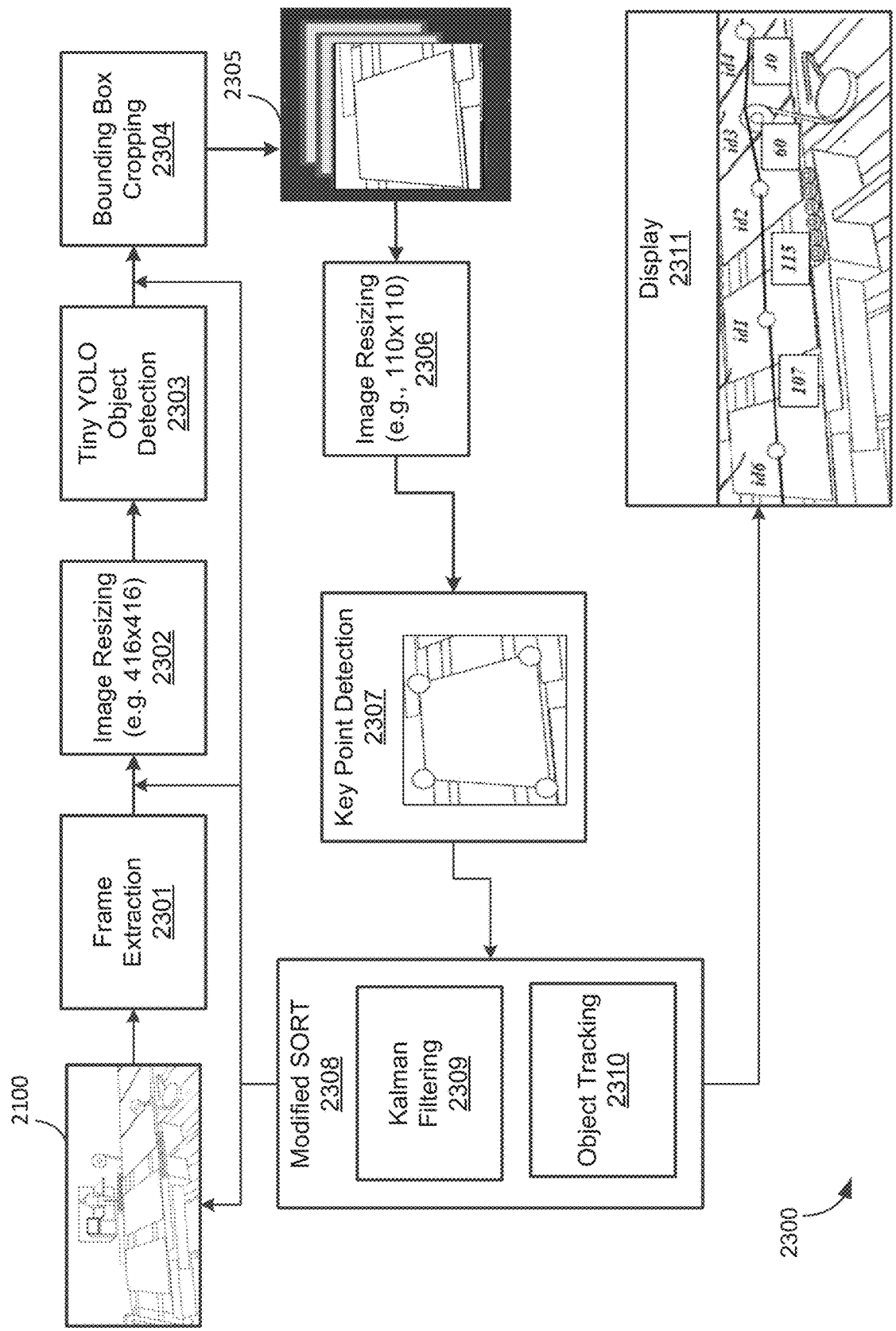
FIG. 23 illustrates an example of a flow diagram for displaying object tracking information in at least one embodiment of the present technology.

FIG. 23 illustrates a flow diagram 2300 (e.g., an artificial intelligence pipeline) for displaying object tracking information.

In an operation 2301 frames are extracted from a video feed 2100. The data representing the frames can be augment or preprocessed. For instance, several data augmentation approaches may be used to make the pipeline models robust. The data augmentation approaches may include color jittering to add noise to the images, sharpening and lightening to perform histogram equalization, random cropping, random flips, and zoom in to train on varying dimensions of the same object.

In an operation 2302, the image is resized. Extracted frames can be resized to 416×416, for example.

In an operation 2303, tiny YOLO object detection is performed. A standard YOLO (You Only Look Once) AI model architecture using Convolutional Neural Networks (CNNs) can be used. The YOLO model draws a bounding box around objects on the assembly line. It can capture objects of varying dimensions. This bounding box information around every object is used to create crops 2305 for each object in the video frame in a bounding box cropping operation 2304. These crops 2305 are then fed to the next stage in the pipeline.

Customizations can be done to these algorithms to make it work for an application (e.g., a manufacturing setting) and also more robust. The standard YOLO architecture may miss out on objects when they come too close to each other. For instance, some pooling layers can be removed from the standard YOLO architecture to have smaller grids which allows embodiments to detect objects even when they are right next to each other, which is common in the manufacturing setting.

The cropped images can be resized in an operation 2306 (e.g., to 110×110).

A key point detection operation 2307 is used to develop a key points model. This is another convolutional neural network (CNN) architecture that takes in as input the crops extracted for every detected object from the YOLO model, and detects key points on objects as defined by the operator/specialist. These are labeled as the x,y pixel coordinates on the video frame, and predictions are made for the same.

In an operation 2308, a modified Simple Online Realtime Tracking (SORT) algorithm can be used. The operation 2308 comprises a Kalman filtering aspect 2309. While there are approaches to track objects using Kalman filtering. These are applied to, or work on the YOLO object detection model. The Kalman filtering aspect 2309 differs from traditional approaches to Kalman filtering in that Kalman filtering is applied to key points. This allows derivation of metrics and other attributes for the object (e.g., a product being manufactured). With other approaches of applying tracking to YOLO, it gives a rectangle bounding box around the object, which cannot really gather any information regarding the features of the object being tracked.

The operation 2308 also comprises an object tracking aspect 2310. Once the objects and key points are detected, intersection-over-union (IOU) of the polygons outlining the objects is computed between consecutive frames. The polygons with highest IOUs are assigned the same identifier (ID) and objects are tracked along the video using these identifiers.

This information derived from the operation 2308 can be fed back to help in subsequent object detection, image resizing and bounding box cropping.

In an operation 2311 derived metrics associated with these identified objects are displayed. Example metrics include information about a set of objects (e.g., a number of objects, distances between objects) or about an individual object (e.g., position of an object, angle of an objects, velocity of an object, acceleration, orientation, skew, alignment or misalignment). This is possible from the key points prediction. In one or more embodiments, the derived metrics can be used to trigger alerts to a controller or notify an operator. These metrics may be used to drive the manufacturing operation in real time. For example, they may help predict and alert about possible jams. In the event of an indicated jam, the controller or operator is notified.

Figure 24:
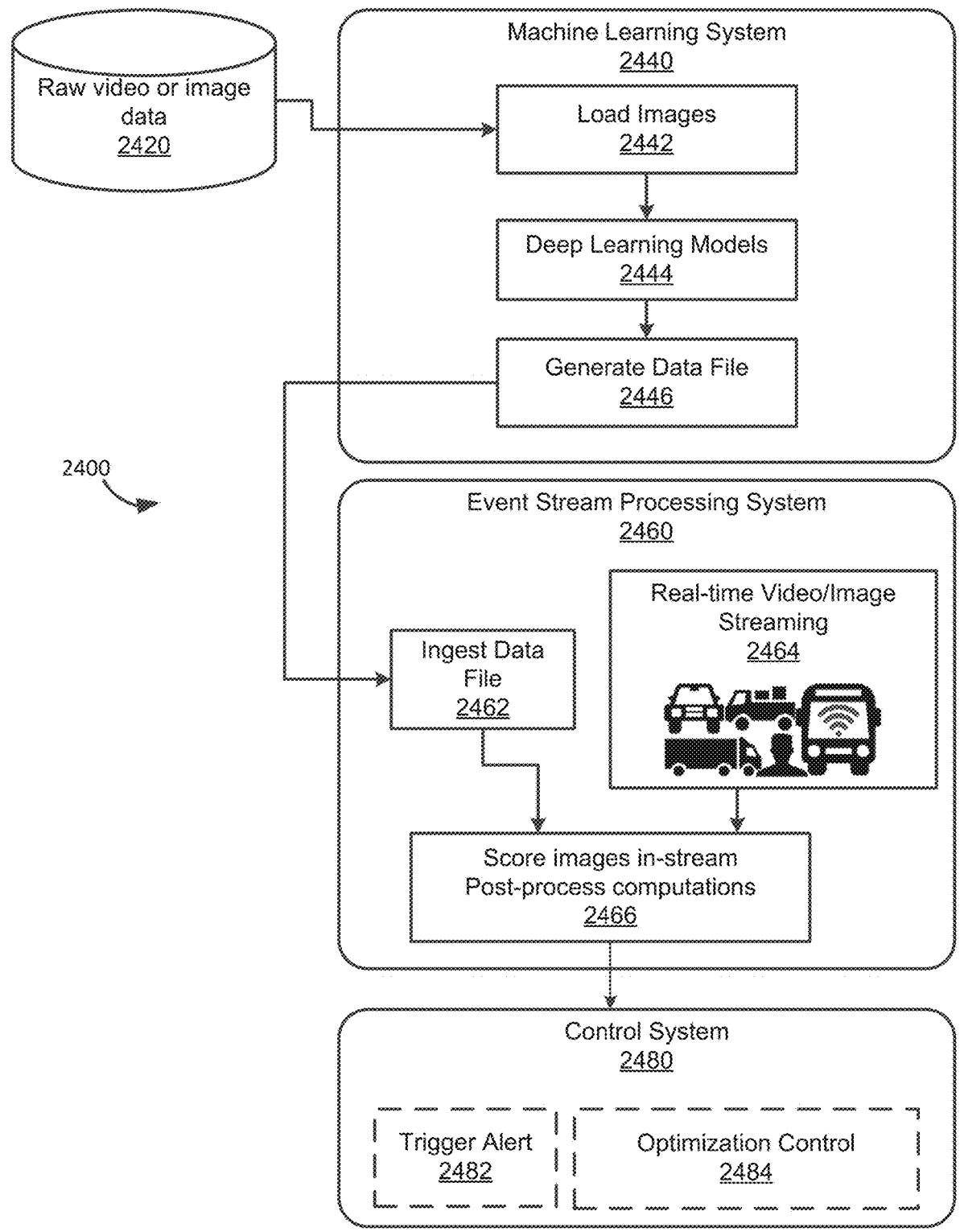
FIG. 24 illustrates an example of a system for displaying object tracking information in at least one embodiment of the present technology.

FIG. 24 illustrates a system 2400 for displaying object tracking information. Raw video or image data 2420 is provided to a machine learning system 2440 to train the models for object detection. For instance, the machine learning system 2440 loads images in an operation 2442, applies deep learning models 2444, and generates a data file 2446. For example, the data file may be an ASTORE file (e.g., generated by a SAS® Viya® Visual Data Mining and Machine Learning (VDMML) procedure provided by SAS Institute Inc. of Cary, N.C.). This data file can be fed into an Event Stream Processing (ESP) System 2460 (e.g., a SAS® Event Stream Processing on the Edge provided by SAS Institute Inc.). The ESP System 2460 ingests the data file in an operation 2462 and real-time video/image streaming is provided in an operation 2464. In an operation 2466, the images are scored in-stream based on the ingested data file and post-process computations are performed. Output from the ESP System 2460 is sent to a control system 2480. In one or more embodiments, the control system is used to trigger an alert in an operation 2482 or optimize control in an operation 2484. For instance, the control system 2480 can be integrated with controllers (programmable logic controllers, PLC) or can be used to send out notifications and signals to other systems (e.g., a real-time SAS® ESP deployment provided by SAS Institute Inc.).

One or more embodiments described herein provided advantageous to traditional object detection by applying an artificial intelligence model based on completely unstructured live video to detect object through obstructions and perform real time scoring/predictions on a live video stream directly from a camera. Traditional YOLO object detection models are improved by embodiments through customization to have smaller grids which helps detect objects even when they get very close to each other. The standard YOLO model would otherwise miss these objects. One or more embodiments, advantageously detect objects through an obstruction, detect objects of varying dimensions, and derive position, angle, velocity, orientation, skew, alignment, and distances between objects, using the key points model prediction and Kalman filtering. Kalman filters allow for the incorporation of temporal information into time-independent deep learning models for robust object tracking with assignment of identifiers.

One or more embodiments, are particularly helpful in a manufacturing environment, by integrating with PLC controllers to send out notifications or alert an operator or to derive engineering metrics associated with objects in video by scaling the computed metrics with respect to the environment (e.g., conveyor belt). One or more embodiments can work with varying camera angles and zoom using various data augmentation approaches. However, embodiments are useful in other domains as explained herein.

What is claimed is:

1. A computer-program product tangibly embodied in a non-transitory machine-readable storage medium, the computer-program product including instructions operable to cause a computing system to:
obtain data representing a first image of a plurality of images, each of the plurality of images capturing different time points of a system in operation, the system in operation comprising a first object and a second object different from the first object;
receive an indication of user-identified data points in a plurality of data points in the data representing the first image, wherein the indication indicates an image coordinate location for each of the user-identified data points in a first coordinate system associated with the first image, and wherein the user-identified data points identify the first object and the second object in the first image;
determine, based on a first set of data points of the user-identified data points, a first boundary of the first object in the first image;
determine, based on a second set of data points of the user-identified data points, a second boundary of the second object in the first image;
identify a first polygon defined by the first boundary, the first polygon representing the first object in the system in operation;
identify a second polygon defined by the second boundary, the second polygon representing the second object in the system in operation;
generate a first component of a dataset, the first component representing initial relative information between the first object and the second object, by:
computing a first data value related to an attribute of a key point of the first set of data points in the first image;
computing a second data value related to an attribute of a key point of the second set of data points in the first image;
generating, based on the first data value and the second data value, the initial relative information between the first object and the second object;
generate a second component of the dataset, the second component representing updated relative information between the first object and the second object, by:
obtaining data representing a second image of the plurality of images subsequent to the first image;
detecting the first polygon and the second polygon in the second image;
determining one or more data points in the first polygon in the second image;
determining one or more data points in the second polygon in the second image;
generating a predicted change in the first data value for the second image;
generating a predicted change in the second data value for the second image;
computing a third data value related to a data point of the one or more data points in the first polygon in the second image, the data point corresponding to the key point of the first set of data points in the first image;
computing a fourth data value related to a data point of the one or more data points in the second polygon in the second image, the data point corresponding to the key point of the second set of data points in the first image;
generating the updated relative information between the first object and the second object, wherein the generating the updated relative information is based on the predicted change in the first data value, the predicted change in the second data value, the third data value, and the fourth data value; and
output one or more components of the dataset.

2. The computer-program product of claim 1, wherein the instructions are operable to cause the computing system to:
extract the data representing the first image from a real-time video feed comprising the plurality of images; and
generate a plurality of data models for identifying the first polygon in the plurality of images by:
augmenting the extracted data by performing one or more of the following to one or more components of the first image: color jittering, sharpening, lightening, flipping, changing one or more dimensions; and cropping; and
setting as data models equivalent ones of the first polygon in the augmented extracted data.

3. The computer-program product of claim 1, wherein the instructions are operable to cause the computing system to compute the first data value related to the attribute of the key point of the plurality of data points in the first image by deriving the key point, from one or more of the user-identified data points, that is a data point different from the user-identified data points.

4. The computer-program product of claim 1, wherein the instructions are operable to cause the computing system to compute a first data value related to the attribute of the key point of the plurality of data points in the first image by:
obtaining a first cropped area encompassing the first polygon in a cropping from the first image;
defining a first cropped area image location of the key point in a second coordinate system defined by the first cropped area which is different than the first coordinate system;
deriving the first data value based on the cropped image location;
obtaining a second cropped area encompassing the first polygon in a cropping from the second image;
determining a second cropped area image location in the second cropped area for each of the one or more data points of the plurality of data points in the first polygon in the second image; and
deriving the third data value based on the second cropped area image location.

5. The computer-program product of claim 1,
wherein the first object has a non-rectangular shape in the first image; and
the instructions are operable to cause the computing system to detect the first polygon in the second image by:
determining a rectangular bounding box for the first polygon;
implementing a you only look once (YOLO) detection algorithm on the rectangular bounding box; and
identifying a non-rectangular shape in the second image corresponding to the non-rectangular shape in the first image.

6. The computer-program product of claim 5,
the instructions are operable to cause the computing system to receive user-identified data points for each corner of the first object shown in the first image; and
wherein the determining the rectangular bounding box for the first polygon comprises extrapolating corners for the rectangular bounding box based on:
determining a maximum distance between one or more of the user-identified data points; and
providing an offset from any corners of the first object.

7. The computer-program product of claim 5, wherein implementing the YOLO detection algorithm on the rectangular bounding box comprises selectively setting, based on a size of a first object, a granularity of a coordinate system associated with the first image or a cropped area from the first image.

8. The computer-program product of claim 1,
wherein the first object is rectangular; and
wherein the instructions are operable to cause the computing system to detect a first polygon in the second image that has a trapezoid shape due to an angle of a recording device that captured the second image.

9. The computer-program product of claim 1, wherein the instructions are operable to cause the computing system to:
predict a predicted change in the first data value by applying a Kalman filter to generate a data table of uncertainties for estimates of the predicted change; and
update the estimates based on the third data value and a weighted average derived from the data table of uncertainties for predicting another data value different from the first data value and the third data value.

10. The computer-program product of claim 1, wherein the instructions are operable to cause the computing system to detect the first polygon in the second image by:
determining an additional boundary for the first object in the second image;
generating a data set representing pixels within the first boundary and the additional boundary; and
labeling, in the data set, pixels within the additional boundary with a same identifier as pixels within the first boundary; and
wherein the pixels within the additional boundary have a different pixel resolution or pixel coding than pixels within the first boundary.

11. The computer-program product of claim 1, wherein the instructions are operable to cause the computing system to:
predict that the first object will undergo a change to become two separate objects in the system in operation;
detect the first polygon in the second image by detecting two detected polygons each corresponding to components of the first polygon; and
assign identifiers to each of the two detected polygons indicating its relationship to the first polygon in the first image.

12. The computer-program product of claim 1, wherein the instructions are operable to cause the computing system to determine the one or more data points in the first polygon in the second image by determining less corresponding data points as the user-identified data points.

13. The computer-program product of claim 1, wherein the instructions are operable to cause the computing system to:
compute an actual change in the first data value to the third data value;
compare the actual change to the predicted change in the first data value for the second image; and
based on the comparison of the actual change to the predicted change in the first data value for the second image, determine a velocity, acceleration, size, or orientation of the first polygon, or one or more data points within the first polygon, indicates to correct an operation of the system in operation.

14. The computer-program product of claim 1, wherein the instructions are operable to cause the computing system to:
compare the updated relative information to a predicted change for the relative information, wherein the predicted change for the relative information is based on the predicted change in the first data value for the second image and the predicted change in the second data value for the second image; and
based on the comparison, trigger a control to correct the system in operation.

15. The computer-program product of claim 14, wherein the instructions are operable to cause the computing system to trigger a control to correct the system in operation by one or more of the following:
sending an electronic notification to an operator of the system in operation;
stopping the operation of the system in operation; and
augmenting the system in operation to correct for the operation.

16. The computer-program product of claim 14, wherein the instructions are operable to cause the computing system to trigger a control to correct an operation of the system in operation by:
selectively storing data related to a plurality of different objects in the plurality of images in storage for further analysis of the operation of the system in operation; and
analyzing data of the storage to determine whether to correct an operation of the system in operation.

17. The computer-program product of claim 1, wherein:
the system in operation is a system for manufacturing a plurality of products;
the first object is one of the plurality of products; and
the first boundary encompasses edges of the first object in view of a device capturing the first image; and
the instructions are operable to cause the computing system to:
predict a predicted change in the first data value based on a predetermined pathway for a given product in the plurality of products during manufacture of the plurality of products in the system in operation; and
trigger a control to correct an operation of the system in operation based on a comparison indicating that the given product has moved beyond a tolerance allowed in the predetermined pathway.

18. The computer-program product of claim 1, wherein the instructions are operable to cause the computing system to:
compute a missing attribute of a data point in an intermediate image between the first image and the second image in the plurality of images, the missing attribute due to an obstruction in a view of the system in operation; and
predict a predicted change in the first data value for a second image subsequent to the first image accounting for the obstruction.

19. The computer-program product of claim 1, wherein the instructions are operable to cause the computing system to detect the first polygon in the second image by training, in an overlapping time period, an object detection model on the first boundary and a data point detection model on one or more data points of the plurality of data points.

20. The computer-program product of claim 1, wherein:
the instructions are operable to cause the computing system to detect the first polygon in the second image amongst a plurality of polygons based on received information regarding one or more attributes of the first object; and
the system in operation is a facial recognition system and the first object is a facial component; or
the system in operation is a transportation, warehouse or manufacturing system and the first object is a product or a vehicle for transporting a product.

21. A computer-implemented method comprising:
obtaining data representing a first image of a plurality of images, each of the plurality of images capturing different time points of a system in operation, the system in operation comprising a first object and a second object different from the first object;
receiving an indication of user-identified data points in a plurality of data points in the data representing the first image, wherein the indication indicates an image coordinate location for each of the user-identified data points in a first coordinate system associated with the first image, and wherein the user-identified data points identify the first object and the second object in the first image;
determining, based on a first set of data points of the user-identified data points, a first boundary of the first object in the first image;
determining, based on a second set of data points of the user-identified data points, a second boundary of the second object in the first image;
identifying a first polygon defined by the first boundary, the first polygon representing the first object in the system in operation;
identifying a second polygon defined by the second boundary, the second polygon representing the second object in the system in operation;
generating a first component of a dataset, the first component representing initial relative information between the first object and the second object, by:
computing a first data value related to an attribute of a key point of the first set of data points in the first image;
computing a second data value related to an attribute of a key point of the second set of data points in the first image;
generating, based on the first data value and the second data value, the initial relative information between the first object and the second object;
generating a second component of the dataset, the second component representing updated relative information between the first object and the second object, by:
obtaining data representing a second image of the plurality of images subsequent to the first image;
detecting the first polygon and the second polygon in the second image;
determining one or more data points in the first polygon in the second image;
determining one or more data points in the second polygon in the second image;
generating a predicted change in the first data value for the second image;
generating a predicted change in the second data value for the second image;
computing a third data value related to a data point of the one or more data points in the first polygon in the second image, the data point corresponding to the key point of the first set of data points in the first image;
computing a fourth data value related to a data point of the one or more data points in the second polygon in the second image, the data point corresponding to the key point of the second set of data points in the first image;
generating the updated relative information between the first object and the second object, wherein the generating the updated relative information is based on the predicted change in the first data value, the predicted change in the second data value, the third data value, and the fourth data value; and
outputting one or more components of the dataset.

22. The computer-implemented method of claim 21, wherein the computing the first data value comprises deriving the key point, from one or more of the user-identified data points, that is a data point different from the user-identified data points.

23. The computer-implemented method of claim 21, wherein the computing the first data value comprises:
obtaining a first cropped area encompassing the first polygon in a cropping from the first image;
defining a first cropped area image location of the key point in a second coordinate system defined by the first cropped area which is different than the first coordinate system;
deriving the first data value based on the cropped image location;
obtaining a second cropped area encompassing the first polygon in a cropping from the second image;
determining a second cropped area image location in the second cropped area for each of the one or more data points of the plurality of data points in the first polygon in the second image; and
deriving the third data value based on the second cropped area image location.

24. The computer-implemented method of claim 21,
wherein the first object has a non-rectangular shape in the first image; and
wherein the detecting the first polygon in the second image comprises:
determining a rectangular bounding box for the first polygon;
implementing a you only look once (YOLO) detection algorithm on the rectangular bounding box; and
identifying a non-rectangular shape in the second image corresponding to the non-rectangular shape in the first image.

25. The computer-implemented method of claim 21,
wherein the predicting a predicted change in the first data value comprises applying a Kalman filter to generate a data table of uncertainties for estimates of the predicted change; and
the computer-implemented method further comprises updating the estimates based on the third data value and a weighted average derived from the data table of uncertainties for predicting another data value different from the first data value and the third data value.

26. The computer-implemented method of claim 21, wherein the detecting the first polygon in the second images comprises:
determining an additional boundary for the first object in the second image;
generating a data set representing pixels within the first boundary and the additional boundary;
labeling, in the data set, pixels within the additional boundary with a same identifier as pixels within the first boundary; and
wherein the pixels within the additional boundary have a different pixel resolution or pixel coding than pixels within the first boundary.

27. The computer-implemented method of claim 21 further comprising:
computing an actual change in the first data value to the third data value;
comparing the actual change to the predicted change in the first data value for the second image; and
based on the comparison of the actual change to the predicted change in the first data value for the second image, determining a velocity, acceleration, size, or orientation of the first polygon, or one or more data points within the first polygon, indicates to correct an operation of the system in operation.

28. The computer-implemented method of claim 21 further comprising:
comparing the updated relative information to a predicted change for the relative information, wherein the predicted change for the relative information is based on the predicted change in the first data value for the second image and the predicted change in the second data value for the second image; and
based on the comparison, triggering a control to correct the system in operation.

29. The computer-implemented method of claim 28, wherein the triggering a control comprises one or more of the following:
sending an electronic notification to an operator of the system in operation;
stopping the operation of the system in operation;
augmenting the system in operation to correct for the operation; and
selectively storing data related to a plurality of different objects in the plurality of images in storage for further analysis of the operation of the system in operation.

30. A computing system comprising processor and memory, the memory containing instructions executable by the processor wherein the computing system is configured to:
obtain data representing a first image of a plurality of images, each of the plurality of images capturing different time points of a system in operation, the system in operation comprising a first object and a second object different from the first object;
receive an indication of user-identified data points in a plurality of data points in the data representing the first image, wherein the indication indicates an image coordinate location for each of the user-identified data points in a first coordinate system associated with the first image, and wherein the user-identified data points identify the first object and the second object in the first image;
determine, based on a first set of data points of the user-identified data points, a first boundary of the first object in the first image;
determine, based on a second set of data points of the user-identified data points, a second boundary of the second object in the first image;
identify a first polygon defined by the first boundary, the first polygon representing the first object in the system in operation;
identify a second polygon defined by the second boundary, the second polygon representing the second object in the system in operation;
generate a first component of a dataset, the first component representing initial relative information between the first object and the second object, by:
computing a first data value related to an attribute of a key point of the first set of data points in the first image;
computing a second data value related to an attribute of a key point of the second set of data points in the first image;
generating, based on the first data value and the second data value, the initial relative information between the first object and the second object;
generate a second component of the dataset, the second component representing updated relative information between the first object and the second object, by:
obtaining data representing a second image of the plurality of images subsequent to the first image;
detecting the first polygon and the second polygon in the second image;
determining one or more data points in the first polygon in the second image;
determining one or more data points in the second polygon in the second image;
generating a predicted change in the first data value for the second image;
generating a predicted change in the second data value for the second image;
computing a third data value related to a data point of the one or more data points in the first polygon in the second image, the data point corresponding to the key point of the first set of data points in the first image;
computing a fourth data value related to a data point of the one or more data points in the second polygon in the second image, the data point corresponding to the key point of the second set of data points in the first image;
generating the updated relative information between the first object and the second object, wherein the generating the updated relative information is based on the predicted change in the first data value, the predicted change in the second data value, the third data value, and the fourth data value; and
output one or more components of the dataset.

* * * * *